(12) United States Patent
Geiger et al.

(10) Patent No.: US 12,509,679 B2
(45) Date of Patent: Dec. 30, 2025

(54) mRNA PURIFICATION BY TANGENTIAL FLOW FILTRATION

(71) Applicant: ethris GmbH, Planegg (DE)

(72) Inventors: Johannes Geiger, Munich (DE); Martin Treml, Munich (DE)

(73) Assignee: ethris GmbH, Planegg (DE)

( * ) Notice: Subject to any disclaimer, the term of this patent is extended or adjusted under 35 U.S.C. 154(b) by 1064 days.

(21) Appl. No.: 17/430,318

(22) PCT Filed: Feb. 11, 2020

(86) PCT No.: PCT/EP2020/053453
§ 371 (c)(1),
(2) Date: Aug. 11, 2021

(87) PCT Pub. No.: WO2020/165158
PCT Pub. Date: Aug. 20, 2020

(65) Prior Publication Data
US 2022/0162586 A1 May 26, 2022

(30) Foreign Application Priority Data
Feb. 11, 2019 (EP) .................................. 19156522

(51) Int. Cl.
*C12N 15/10* (2006.01)
*A61K 31/7088* (2006.01)

(52) U.S. Cl.
CPC ...... *C12N 15/1017* (2013.01); *A61K 31/7088* (2013.01)

(58) Field of Classification Search
CPC ................................................ C12N 15/1017
See application file for complete search history.

(56) References Cited

U.S. PATENT DOCUMENTS

| 9,850,269 B2 * | 12/2017 | DeRosa ............. C12N 15/1017 |
| 10,155,785 B2 | 12/2018 | DeRosa et al. |
| 2016/0024139 A1 | 1/2016 | Scorza et al. |
| 2018/0298372 A1 * | 10/2018 | Funkner .................. C12P 19/34 |

FOREIGN PATENT DOCUMENTS

| CA | 2790941 C * | 10/2018 | ......... C12N 15/1003 |
| EA | 201591229 A1 | 1/2016 | |
| EA | 201691696 A1 | 3/2017 | |
| JP | 2012125200 A | 7/2012 | |
| WO | WO 2014/140211 A1 | 9/2014 | |
| WO | WO 2015/164773 A1 | 10/2015 | |
| WO | WO 2016/193206 A1 | 12/2016 | |
| WO | 2018/157133 A1 | 8/2018 | |
| WO | WO 2018/157141 A1 | 8/2018 | |

OTHER PUBLICATIONS

European Search Report for European Application No. EP 24165605, dated Jul. 15, 2024, 11 pages.
Sousa et al., "mRNA vaccines manufacturing: Challenges and bottlenecks," Vaccine, Mar. 24, 2021, pp. 2190-2220.
International Search Report issued in International Application No. PCT/EP2020/053453 dated Jun. 4, 2020.

\* cited by examiner

*Primary Examiner* — Robert J Yamasaki
(74) *Attorney, Agent, or Firm* — Klarquist Sparkman, LLP

(57) ABSTRACT

The present disclosure provides a method of purifying mRNA molecules comprising (Ia) purifying precipitated mRNA molecules from a suspension comprising precipitated mRNA molecules, (Ib) washing and dissolving the purified precipitated mRNA molecules, (IIa) purifying the mRNA molecules using a solution comprising a chelating agent, followed by (IIb) washing the purified mRNA molecules, wherein steps (Ia) to (IIb) are performed using tangential flow filtration.

Figure 1:
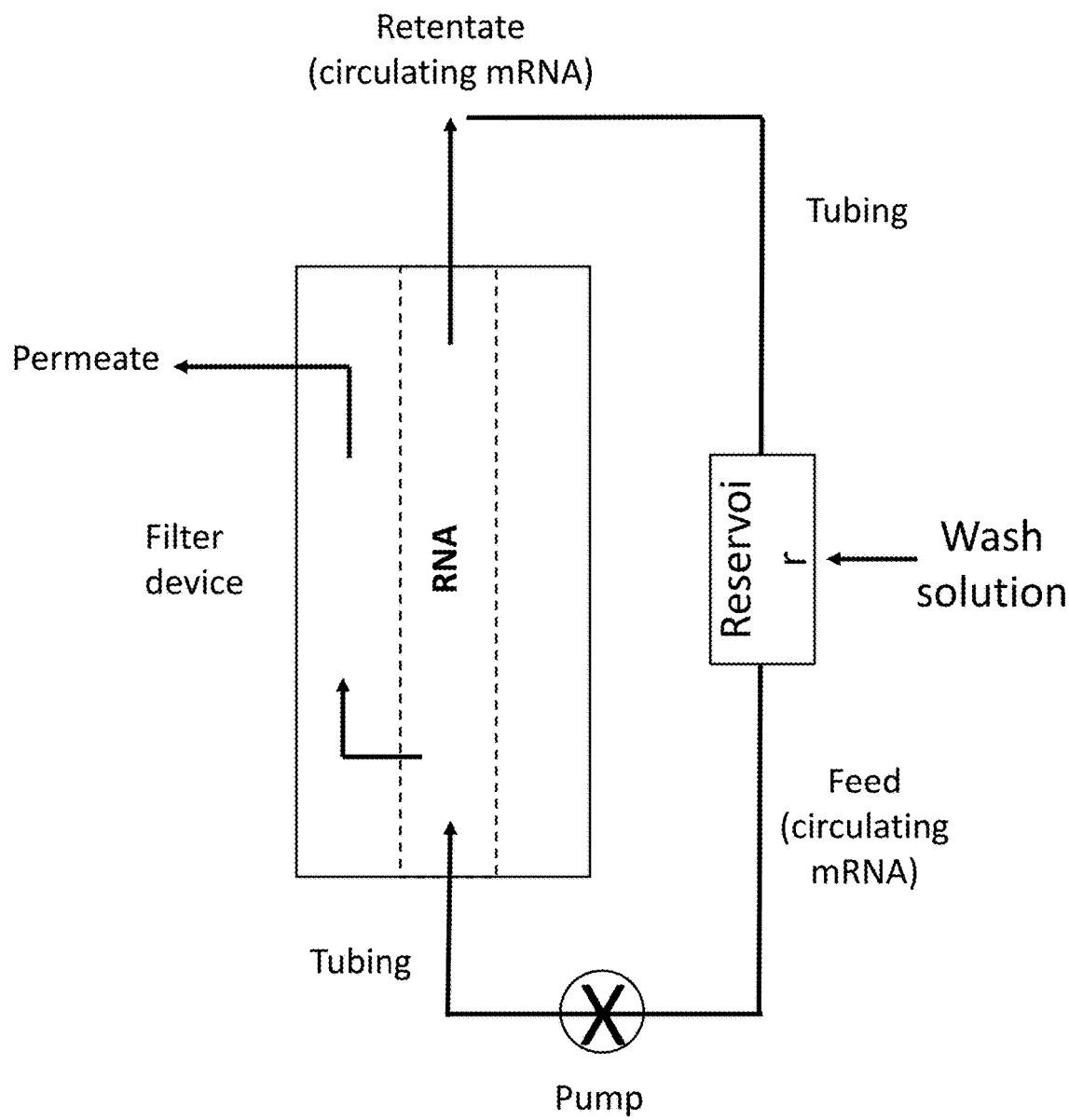

15 Claims, 11 Drawing Sheets
Specification includes a Sequence Listing.

Figure 6
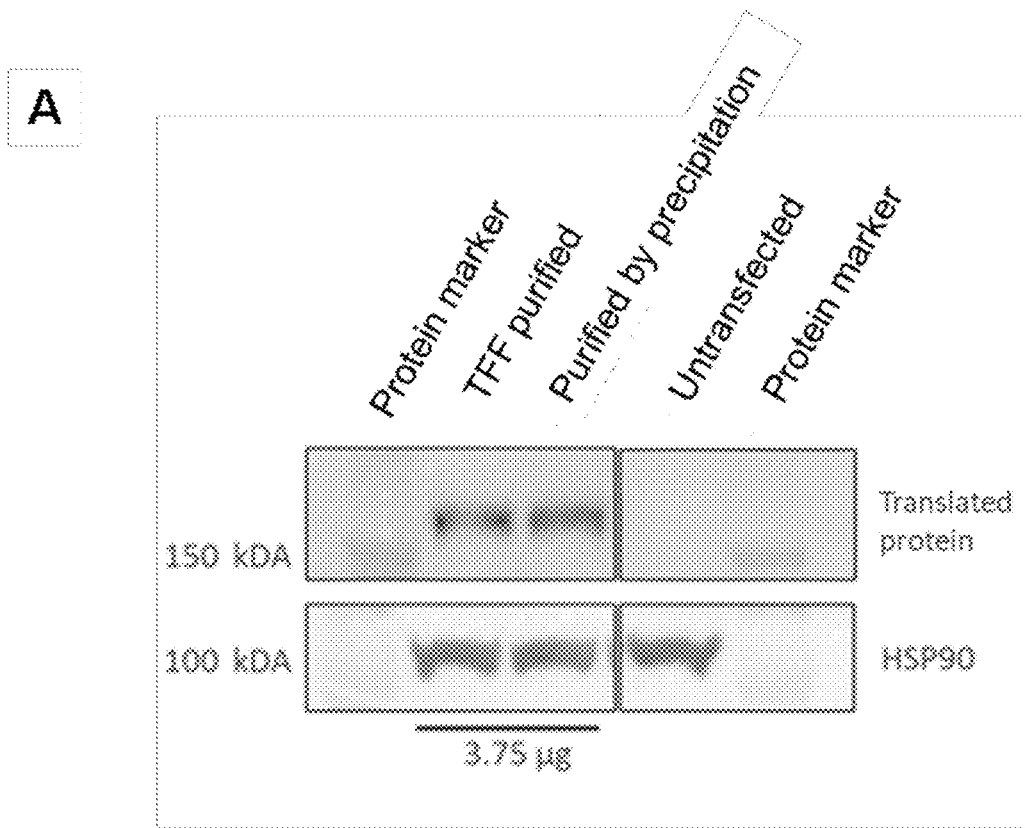
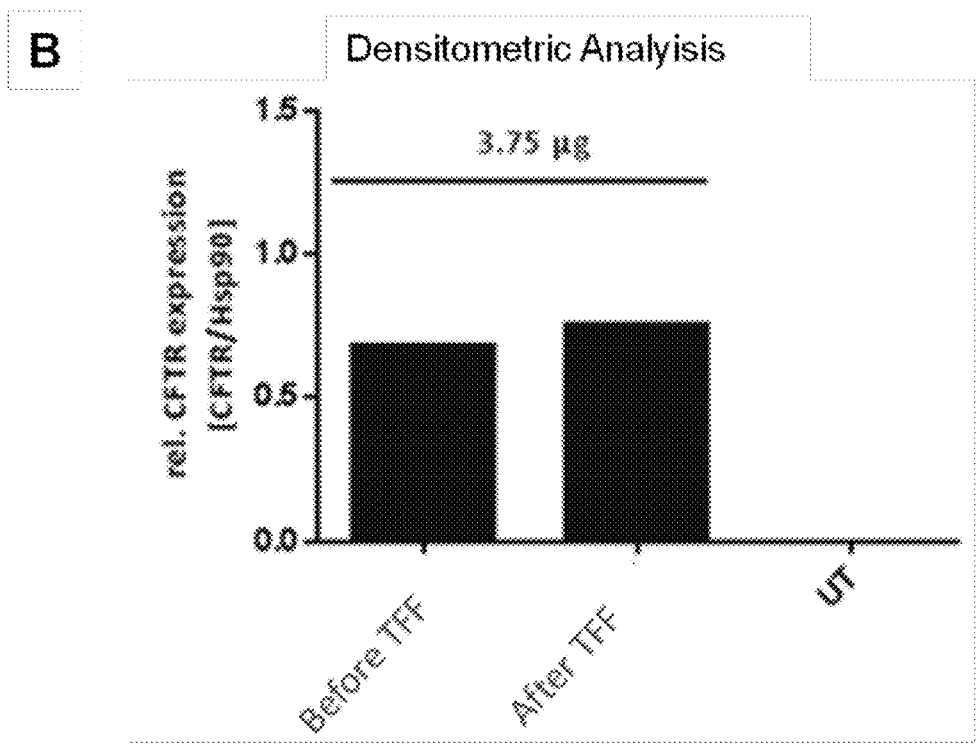

Figure 7

| mRNA size [nt] | Amount of spiked in RNA normalized to hCFTR SNIM® RNA after x wash volumes [%] | | | | | |
|---|---|---|---|---|---|---|
| | Before TFF | 5x washing buffer | 10x washing buffer | 15x washing buffer | 20x washing buffer | 20x washing buffer 10x nuclease free water |
| 3632 | 17.1% | 17.5% | 16.6% | 18.3% | 19.0% | 18.1% |
| 1864 | 12.1% | 12.4% | 12.9% | 13.0% | 14.2% | 12.9% |
| 951 | 13.9% | 13.4% | 15.3% | 13.2% | 15.3% | 12.2% |
| 494 | 17.4% | 11.3% | 9.4% | 8.0% | 7.2% | 6.2% |
| 256 | 20.3% | 4.6% | 2.0% | 1.1% | 0.8% | 0.7% |

Figure 8

| mRNA size [nt] | Amount of spiked in RNA normalized to hCFTR SNIM® RNA after x wash volumes [%] | | | | | |
|---|---|---|---|---|---|---|
| | Before TFF | 5x washing buffer | 10x washing buffer | 15x washing buffer | 20x washing buffer | 20x washing buffer 10x nuclease free water |
| 3632 | 17.2% | 18.7% | 19.6% | 18.3% | 19.6% | 18.7% |
| 1864 | 13.1% | 14.2% | 14.6% | 13.9% | 14.2% | 13.7% |
| 951 | 15.6% | 15.1% | 15.0% | 14.2% | 15.0% | 14.6% |
| 494 | 19.0% | 14.2% | 12.6% | 10.5% | 10.2% | 9.3% |
| 256 | 22.4% | 6.4% | 3.7% | 2.2% | 1.8% | 1.5% |

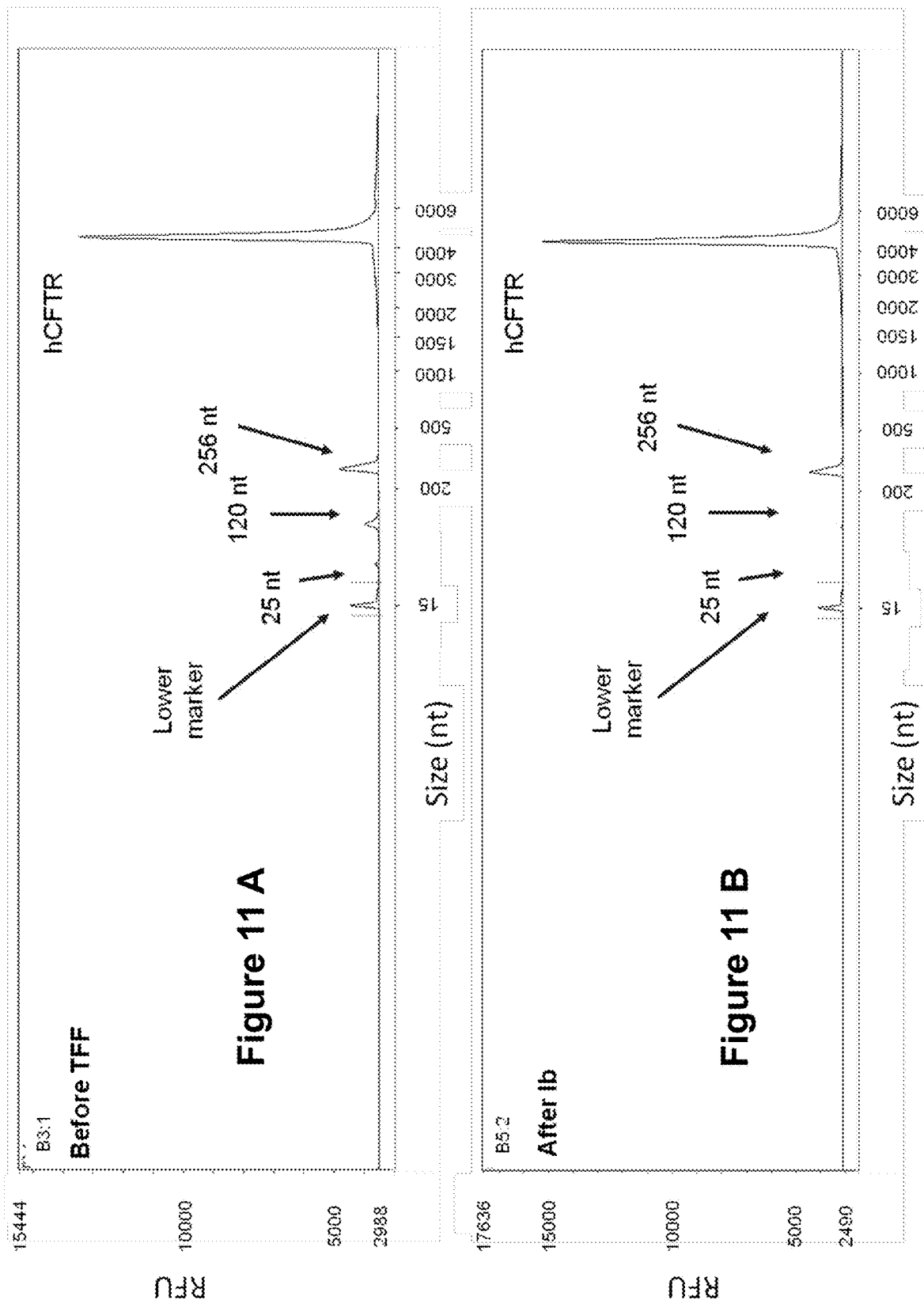

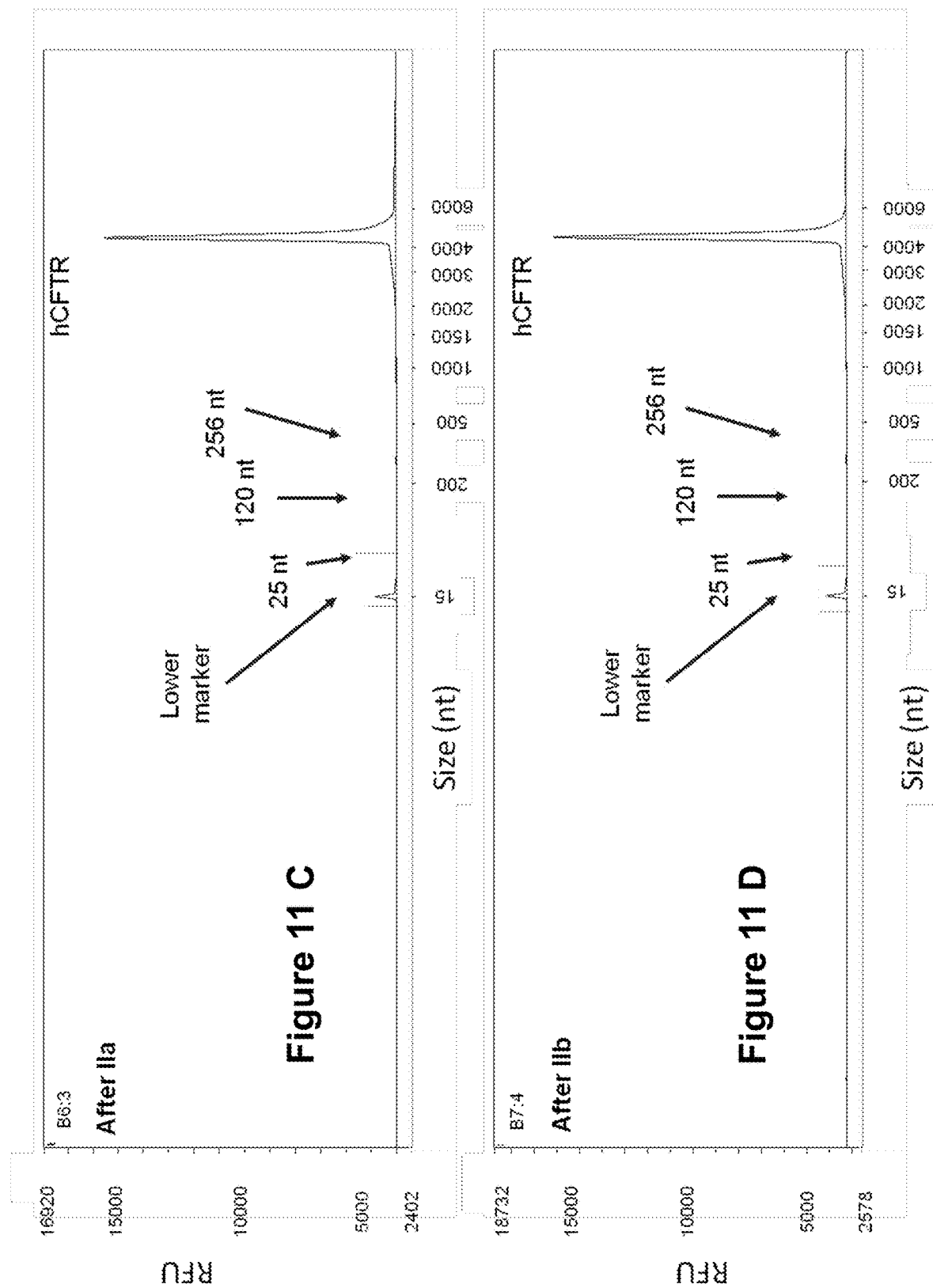

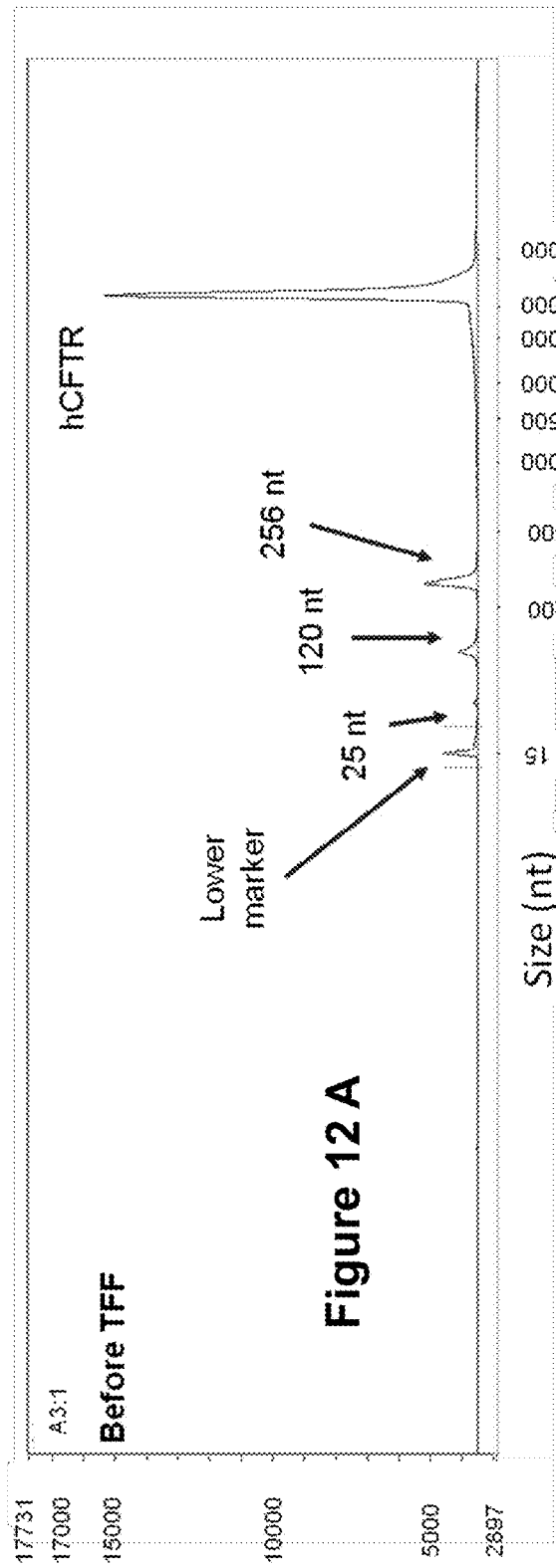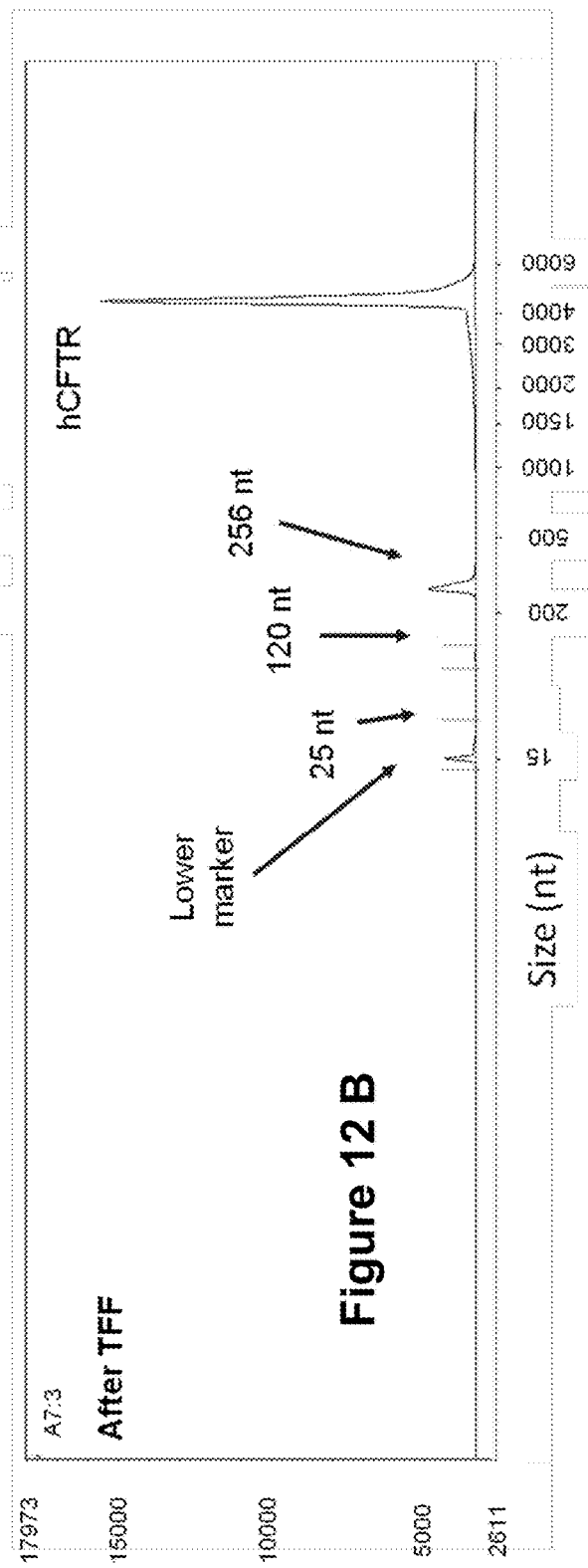
Figure 12 A    Figure 12 B mRNA PURIFICATION BY TANGENTIAL FLOW FILTRATION

RELATED APPLICATIONS

This application is a national stage filing under 35 U.S.C. 371 of International Application No. PCT/EP2020/053453, filed Feb. 11, 2020, which claims the benefit of EP Application Serial No. 19156522.5, filed on Feb. 11, 2019. The entire teachings of the above applications are incorporated herein by reference. International Application No. PCT/EP2020/053453 was published under PCT Article 21(2) in English.

The present invention relates to a method of purifying mRNA molecules comprising (Ia) purifying precipitated mRNA molecules from a suspension comprising precipitated mRNA molecules, (Ib) washing and dissolving the purified precipitated mRNA molecules, (IIa) purifying the mRNA molecules using a solution comprising a chelating agent, followed by (IIb) washing the purified mRNA molecules, wherein steps (Ia) to (IIb) are performed using tangential flow filtration.

Genetic information is stored as deoxyribonucleic acid (DNA) in the cell and can be transcribed into ribonucleic acid (RNA) when required. Both, DNA and RNA molecules are built up of nucleotides consisting of a nitrogenous base, a five-carbon sugar, and at least one phosphate group. Different types of RNA molecules exist including mRNA molecules that carry the genetic information for protein synthesis. In eukaryotes, these mRNA molecules are transcribed from the DNA as pre-mature mRNA molecules and are subsequently modified by adding for example a 5' cap and a 3' polyadenosine (poly(A)) tail. The mature mRNA molecules are then transferred from the cell nucleus into the cytoplasm where they are translated into proteins. Thus, the DNA sequence as well as the amount, stability and translational efficiency of the mature mRNA molecule mainly determine the protein synthesis in a cell.

For optimizing the synthesis of a desired protein in a cell, for example in therapeutic contexts, mRNA based approaches represent a promising tool. The use of mRNA molecules has the advantage that the molecules have to be introduced only into the cytoplasm of a cell for protein translation (Tavernier et al., 2011, J Control Release, 150 (3):238-247; Yamamoto et al., 2009, Eur J Pharm Biopharm, 71(3):484-489). Compared to the use of the respective DNA sequence comprised in an appropriate carrier such as a plasmid, the use of mRNA molecules is furthermore less difficult, more efficient, and avoids the considerable risk of chromosomal DNA being altered if the plasmid or parts thereof become incorporated into the genome. The mRNA molecules are primarily generated by in vitro transcription, e.g. in therapeutic applications. Such approaches are based on DNA templates, which are generated either by linearization of plasmid DNA itself or polymerase chain reaction (PCR) from a plasmid DNA. Both approaches are well established and can easily be scaled up. However, in both cases the mRNA molecules have to be purified before they can be used in downstream applications.

Purification of synthesized mRNA molecules is crucial as contaminants negatively affect most downstream applications, especially in therapeutic contexts. Different by-products can contaminate the desired mRNA molecules such as components used and/or generated in upstream processes such as mRNA synthesis. In case of both, in vivo and in vitro approaches, short mRNA molecule fragments can occur for example by hydrolysis and abortive transcription. mRNA molecule hydrolysis can occur in the presence of a catalyst or an enzyme, but also spontaneously, and results in the degradation of the respective mRNA molecule and thus, in the formation of mRNA molecule fragments of variable length. In case of abortive transcription (cf. e.g. Revyakin et al., 2006, Science, 314(5802):1139-1143), the RNA polymerase binds to the respective promoter element in a DNA molecule for transcription, unwinds the DNA double strand surrounding the transcription start site and starts with the synthesis of an mRNA molecule. However, in some cases the RNA polymerase does not escape the promoter region of the DNA, but remains stationary while transcribing a part of the DNA molecule. As the unwound DNA accumulates within the enzyme, the RNA polymerase ejects the part of the DNA in which the genetic information for transcription is stored and releases the synthesized RNA molecule of one to 15 nucleotides in length (cf. e.g. Goldman et al., 2009, Science, 324(5929):927-928). To avoid for example an undesired immune response upon administration of a pharmaceutical composition comprising such short mRNA molecule fragments, it is highly desirable to obtain purified non-fragmented mRNA molecules for further downstream applications, especially in therapeutic contexts.

Different approaches for purification of mRNA molecules exist including precipitation and filtration as well as combinations thereof. For removing undesired salts, nucleotides, and proteins, RNA precipitation based approaches represent for example an easy and cost effective method to obtain purified RNA molecules as a pellet that can be resuspended in a buffer of choice. Different solutions can be used for precipitation comprising for example guanidine thiocyanate (GSCN), ammonium acetate ($NH_4OAc$), ethanol, lithium chloride, and sodium acetate (reviewed e.g. by Walker and Lorsch, 2013, Methods Enzymol, 530:337-343). On the other hand, filtration methods are based on mechanical concepts for purifying a target molecule such as mRNA molecules. In case of filtration, a feed, i.e. a solution or suspension comprising the target molecules such as mRNA molecules, is passed through or across a filter membrane with the latter being referred to as tangential flow filtration (TFF).

WO 2014/152966 A1 and WO 2015/164773 A1 disclose for example methods for the purification of mRNA molecules using TFF with varying solution and/or suspension volumes. mRNA molecules are purified by precipitating the mRNA molecules using for example urea, GSCN, and/or potassium chloride and precipitates are washed multiple times. However, in both cases it is not shown that the methods are able to purify the target mRNA molecules in view of short mRNA fragments such as abortive mRNA molecules and/or hydrolysis products.

WO 2016/193206 A1 discloses a method for producing and purifying RNA, wherein the RNA purification comprises at least one TFF step and preferably no step comprising a phenol/chloroform extraction and/or DNA and/or RNA precipitation. Furthermore, the RNA molecules are preferably purified by applying an additional purification step using for example cation and/or anion exchange chromatography, and/or reversed-phase chromatography. As above, the document does not disclose the purification of target RNA molecules in view of abortive mRNA molecules and/or mRNA molecule hydrolysis products.

WO 2018/157133 A1 discloses methods for large-scale purification of mRNA molecules. The invention refers especially to the use of a stirred cell or agitated Nutsche filtration device for preparing clean and homogeneous mRNA molecule compositions. As shown in the Examples, mRNA molecules are precipitated using GSCN and the precipitate is washed using a solution comprising GSCN and ethanol. Interestingly, the mRNA molecule compositions obtained by the claimed method is compared to compositions comprising mRNA molecules purified using TFF and it is shown that only the TFF based purification resulted in a solution that comprised residual enzymes besides the target mRNA molecules.

Hence, there is still a need to have at hand alternative solutions for being able to efficiently purify mRNA molecules on large scale, especially in view of abortive mRNA molecules and mRNA molecule hydrolysis products, ensuring low levels of salts that can be problematic for downstream applications such as GSCN and using a system that can easily be automated.

The present application addresses the need for obtaining purified mRNA molecules with high-throughput by providing the embodiments as recited in the claims.

In particular, the present invention relates to a method of purifying mRNA molecules, said method comprising (Ia) purifying precipitated mRNA molecules from a suspension comprising precipitated mRNA molecules using a first solution, (Ib) washing and dissolving the purified precipitated mRNA molecules obtained from step (Ia) using a second solution, (IIa) purifying the mRNA molecules from the dissolved mRNA molecules obtained from step (Ib) using a third solution comprising a chelating agent, followed by (IIb) washing the purified mRNA molecules obtained from step (IIa) using a fourth solution, wherein steps (Ia) to (IIb) are performed using tangential flow filtration.

Surprisingly, it has been found that the method according to the present invention results in a high degree of purification of mRNA molecules and thus, in a solution comprising purified mRNA molecules but no or almost no mRNA molecule hydrolysis products and abortive mRNA molecules. In particular, it has been found that by applying said method mRNA molecule hydrolysis products, abortive mRNA molecules, proteins, and salts that can be problematic for downstream applications are efficiently removed. Thus, by applying the method according to the present invention a solution comprising purified mRNA molecules can be obtained that is suitable for downstream applications such as pharmaceutical applications.

In the context of the present invention, the term "a method for purifying" refers to a method for obtaining target molecules from a mixture, e.g. a solution or suspension, comprising said target molecules to be purified and components other than the target molecules, wherein the concentration of the target molecules is enhanced or increased in the solution obtained after performing said method compared to the concentration of the target molecules in the mixture before performing said method. The purification of target molecules can also be referred to as the enrichment of said target molecules by removing or at least substantially removing components other than the target molecules.

In the context of the present invention, the target molecules are mRNA molecules. Herein, the term "mRNA" and "mRNA molecule", which are used interchangeable, refer to a single-stranded RNA molecule built up for example of A, C, G, and/or U nucleotides, i.e. nucleotides comprising adenine, guanine, cytosine, and uracil as the respective nitrogenous base. Furthermore, an mRNA molecule contains one or more coding sequences that can be used as a template during synthesis of an amino acid sequence during translation. Thus, the mRNA molecule to be purified preferably comprises a coding sequence, i.e. a sequence that can be translated into an amino acid sequence such as a protein and that comprises a start and a stop codon. The coding sequence can be a naturally occurring sequence, a partly or fully codon optimized sequence derived from the natural sequence to be used or an artificial sequence. Codon optimization refers to a technique which is applied to maximize protein expression by increasing the translational efficiency of the respective mRNA molecule as in some cases codons exist that are preferentially used by some species for a given amino acid. Further, said mRNA molecule might comprise a 5' and/or a 3' untranslated region (UTRs), one or more internal ribosome entry site(s) (IRES), one or more additional sequences for promoting translation, and/or one or more modifications to adjust and/or extend the duration of action. Further features of mRNA molecules are described in further detail below.

Hence, the term "mRNA" should be understood to mean any RNA molecule which is suitable for the expression of an amino acid sequence or which is translatable into an amino acid sequence such as a protein. Thus, an "mRNA molecule" is intended to be understood as an mRNA molecule that exhibits a property and/or activity by which it is characterized and thus, can be translated into an amino acid sequence such as a protein with said amino acid sequence showing the activity and/or property by which it is characterized.

Herein, the term "amino acid sequence" encompasses any kind of amino acid sequence, i.e. chains of two or more amino acids which are each linked via peptide bonds and refers to any amino acid sequence of interest. Preferably, the encoded amino acid sequence is at least 5 amino acids long, more preferably at least 10 amino acids, even more preferably at least 50, 100, 200 or 500 amino acids. Thus, the term "amino acid sequence" covers short peptides, oligopeptides, polypeptides, fusion proteins, proteins as well as fragments thereof, such as parts of known proteins, preferably functional parts. These can, for example be biologically active parts of a protein or antigenic parts such as epitopes which can be effective in raising antibodies. As regards the function of the amino acid sequence, there is no limitation and possible amino acid sequences are described further below in detail.

In contrast, components to be removed during purification of said mRNA molecules and thus, components other than the target molecules include for example mRNA molecules that are partially or completely degraded by hydrolysis. Degradation by hydrolysis is a random process and the resulting degradation products, herein referred to as "hydrolysis products" or also "mRNA molecule hydrolysis products", are shorter by at least 1 nucleotide than the mRNA molecule that was hydrolyzed. Thus, depending on the length of the mRNA molecule that was hydrolyzed, the resulting hydrolysis products can have for example a length of less than 10,000 nucleotides, preferably less than 5,000 nucleotides, more preferably of less than 500 nucleotides, even more preferably less than 250 nucleotides, even more preferably less than 170 nucleotides, and most preferably less than 120 nucleotides. Another example for components to be removed are abortive mRNA molecules that can have a length of for example less than 50 nucleotides, preferably less than 25 nucleotides, and more preferably less than 15 nucleotides.

Furthermore, components to be removed during purification of the mRNA molecules include for example components used during in vitro synthesis of the target molecules such as in vitro transcription of mRNA molecules and/or components comprised in cells used for amplification of templates for the synthesis of the target molecules and/or for the transcription of mRNA molecules. In case of in vitro transcription of mRNA molecules, such components comprise for example proteins such as enzymes used for in vitro transcription; salts; ions such as magnesium ions; nucleosidtriphosphates; mono-, di-, and/or triphosphates including 5' caps and/or 5' cap analogues; abortive transcripts; hydrolysis products; a buffer such as 3-(N-morpholino)propanesulfonic acid (MOPS); and/or a chelating agent such as ethylenediaminetetraacetic acid (EDTA).

The method according to the present invention is performed by tangential flow filtration (TFF). TFF is characterized in that the suspension or solution comprising the mRNA molecules to be purified flows tangentially across the surface of a filter membrane with the mRNA molecules being preferably retained in the retentate. Hence, by performing TFF for purifying the mRNA molecules the presence of a filter cake that can clog the filter membrane by the time is avoided and thus, the time the filter membrane can be used is increased.

Thus, the system for purifying target molecules according to the present invention is a TFF system. A TFF system typically comprises a filter device such as a capsule, cassette and holder, or hollow fiber module, a pump, tubing, a valve or clamp, and a fluid reservoir, and optionally a pressure gauge (cf. FIG. 1). Such a TFF system can be used continuously even with high mRNA molecule concentrations without clogging of the filter membrane pores. The use of a TFF system is advantageous as it allows high-throughput purification of the mRNA molecules to be purified.

Of note, the term "solution" commonly refers to a homogenous mixture of two or more substances and is in particular applied to the liquid state of matter, though solutions of gases and solids are possible as well, Herein, the term "solution", especially in case of the "first solution", "second solution", "third solution", and "fourth solution" according to the present invention, encompasses a liquid such as water, a, preferably homogeneous, mixture of liquids, as well as for example a mixture of a liquid and a, preferably dissolved salt.

According to the present invention, a method of purifying mRNA molecules is provided, wherein said method comprises as step (Ia) the purification of precipitated mRNA molecules from a suspension that comprises said precipitated mRNA molecules. Said purification is achieved using a first solution. The suspension comprising precipitated mRNA molecules can be obtained for example by cell lysis or in vitro transcription. Thus, precipitated mRNA molecules have to be purified from components of cells or of in vitro transcription mixtures, such as amino acid sequences including proteins and enzymes, nucleoside triphosphates, buffer components, and optionally 5' caps and 5' cap analogs. 5' caps and 5' cap analogs can be comprised in the suspension used for performing step (Ia) for example in case the mRNA molecules have been transcribed in vitro and have been co-transcriptionally 5' capped. Hence, step (Ia) is advantageous for removing cellular components or components from in vitro transcription mixtures from precipitated mRNA molecules.

In some embodiments of the present invention the first solution contains ammonium acetate ($NH_4OAc$). Thus, the precipitated mRNA molecules are purified from the suspension using a first solution comprising $NH_4OAc$. Furthermore, the first solution preferably has a pH in the range of 1 to 12, more preferably in the range of 1 to 10, even more preferably in the range of 3 to 9, and most preferably in the range of 6 to 8. Thus, the precipitated mRNA molecules are purified from the suspension comprising precipitated mRNA molecules using a first solution that comprises $NH_4OAc$ and has a pH in the range of 1 to 12, preferably of in the range of 1 to 10, more preferably in the range of 3 to 9, and even more preferably in the range of 6 to 8.

The method of purifying mRNA molecules according to the present invention further comprises as step (Ib) the washing and dissolving of the purified precipitated mRNA molecules obtained from step (Ia) described above using a second solution. Said second solution can be any solution in which the mRNA molecules can be resuspended and in which the mRNA molecules remain stable, i.e. do not hydrolyze, for example water. Performing step (Ib) is advantageous for removing especially components of the first solution and for obtaining dissolved mRNA molecules.

In some embodiments of the present invention the second solution is water.

The method of purifying mRNA molecules according to the present invention further comprises as step (IIa) the purification of the mRNA molecules from the dissolved mRNA molecules obtained from step (Ib) using a third solution comprising a chelating agent. This is particularly advantageous for removing abortive mRNA molecules and hydrolysis products from the solution comprising the dissolved mRNA molecules.

The term "chelating agent" refers to molecules which chelate cations, and in particular to molecules with donor groups that can bind to a central atom in a coordination complex depending on several factors such as pH and/or temperature, the concentration of the chelating agent, and/or the type of cation to be chelated. Chelating agents can be characterized for example by the number of dentates, i.e. the number of donor groups, per molecule and/or the number of coordinating positions at the cation to be chelated. For example, the chelating agent EDTA has six dentates and chelates a divalent cation in a 1:1 chelating agent divalent cation complex.

Preferably, in the context of the present invention, the term "chelating agent" refers to chelating agents which are able to complex divalent and/or trivalent cations such as for example divalent magnesium and calcium ions and/or trivalent iron ions. Generally, chelating agents with less than four coordinating positions at the cation have lower chelating activity compared to chelating agents with four or more coordinating positions at the cation, especially in view of efficiently complexing divalent and/or trivalent cations.

Chelating agents according to the present invention are chelating agents with at least four coordinating positions at the cation to be chelated, more preferably chelating agents with more than four coordinating positions at the cation to be chelated, even more preferably at least four dentates per molecule, herein also referred to as "potent chelating agents", more preferably chelating agents with more than four coordinating positions at the cation to be chelated that are used in pharmaceutical compositions and/or formulations, and even more preferably EDTA. Chelating agents with more than four coordinating positions at the cation to be chelated that are used in pharmaceutical compositions are for example used in antidots comprising Na2EDTA solution (e.g. 2 g/10 ml; cf. e.g. GPUPharma GmbH) and/or calcium dinatrium EDTA (e.g. 50 mg/ml, Amp. 10 ml; cf. e.g. Laboratoires SERB), or for example used as excipients (cf. e.g. Phenhydan, Desitin Arzneimittel GmbH; or Soluvit N, Baxter; or Fluimucil, Zambon GmbH).

Hence, in some embodiments of the present invention the chelating agent is EDTA. Examples of preferred chelating agents are listed in Table 1 with EDTA being a most preferred chelating agent.

TABLE 1

| Name | Abbrevations | Dentates per molecule |
|---|---|---|
| Nitrilotriacetic acid | NTA | 4 |
| Ethylenediaminetetraacetic acid | EDTA | 6 |
| Cyclohexanediaminetetraacetic acid | CDTA | 6 |
| Diethylenetriaminepentaacetic acid | DTPA | 8 |
| Ethylene glycol-bis(2-aminoethylether)-N,N,N',N'-tetraacetic acid | EGTA | 6 |
| N-(2-Hydroxyethyl)ethylenediamine-N,N,N'-triacetic acid | HEDTA | 5 |
| Triethylenetetraminehexaacetate | TTHA | 10 |
| Ethylenediamine-N,N'-disuccinic acid | EDDS | 6 |
| Trans-1,2-Diaminocyclohexanetetraacetic acid | DCTA | 6 |
| 1,3-Propylendiamintetraacetic acid | PDTA | 6 |

Potent chelating agents such as EDTA can efficiently remove especially divalent cations such as magnesium cations. Magnesium cations are for example required by enzymes involved in the transcription of mRNA molecules and thus present at high levels in cellular and in vitro transcription mixtures. It has been found by the present inventors that an efficient removal of hydrolysis products and abortive mRNA molecules can be achieved using a potent chelating agent such as EDTA in step (IIa), thereby allowing a high degree of purification of mRNA molecules. Without being bond to theory, it is hypothesized that said the above-mentioned cations may support the formation of secondary and tertiary structures of mRNA molecules and that the removal especially of divalent cations such as magnesium cations may be of particular relevance for the purification of mRNA molecules as abortive mRNA molecules and hydrolysis products may tend to bind to the mRNA molecules to be purified in the presence of said cations. Thus, it is believed that by removing divalent cations using a potent chelating agent such as EDTA in step (IIa) the melting point is reduced and the secondary and/or tertiary structure of the mRNA molecules affected. Hence, abortive mRNA molecules and hydrolysis products can be removed as permeate. Hence, step (IIa) is particularly advantageous for removing abortive mRNA molecules and hydrolysis products.

According to the present invention, the third solution comprises a chelating agent, preferably a potent chelating agent as defined above, most preferably EDTA. As stated above, the complexing ability of chelating agents can be influenced by the pH as the complex building constant of a given chelating agent is influenced by the pH. For example EDTA is especially potent at higher pH values such as at a pH between 8 and 10 in view of chelating magnesium ions. However, it is desirable to adjust the pH in view of an optimal trade-off between the complexing ability of a given chelating agent and the stability of the mRNA molecules to be purified. In this context, it has been observed that a potent chelating agent such as EDTA can efficiently remove especially divalent cations at a pH between 1 and 10, preferably between 6 and 8. Thus, without being bond to theory, it is hypothesized that by this the melting point especially of abortive mRNA molecules and hydrolysis products that are bound to mRNA molecules can be reduced by potent chelating agents such as EDTA and thus, abortive mRNA molecules and hydrolysis products can be removed while having a pH that is at the same time adjusted to a value that preserves the stability of the mRNA molecules to be purified.

Thus, in a preferred embodiment the pH value in the third solution containing a chelating agent is adjusted to a pH value in which the respective chelating agent has an optimal chelating capacity.

Hence, using, e.g., a potent chelating agent such as EDTA at a pH between 1 and 10, preferably at a pH between 6 and 8, is advantageous for an efficient removal of divalent cations and thus, in turn for an efficient removal of abortive mRNA molecules and hydrolysis products. In case one of the alternative chelating agents mentioned above is used, it might be required to adjust the pH to a pH value in which said alternative is effective in removing ions, preferably, divalent magnesium cations. Corresponding pH ranges are indicated in the Table above for preferred chelating agents.

In some embodiments, the third solution has a pH in the range of 1 and 10, preferably in the range between 3 and 9, and more preferably in the range between 6 and 8.

The pH of the third solution can be obtained using a buffer. Preferred buffers (with their respective pH ranges given in brackets) comprise 2-[bis(2-hydroxyethyl)amino]-2-(hydroxymethyl)propane-1,3-diol (Bis-Tris; pH range 5.8-7.2), N-(2-acetamido)iminodiacetic acid (ADA; pH range 6.0-7.2), N-(2-acetamido)-2-aminoethanesulfonic acid (ACES; pH range 6.1-7.5), 1,4-piperazinediethanesulfonic acid (PIPES; pH range 6.1-7.5), 2-hydroxy-3-morpholin-4-ylpropane-1-sulfonic acid (MOPSO; pH range 6.2-7.6), 1,3-bis(tris(hydroxymethyl)methylamino)propane (Bis-Tris propane; pH range 6.3-9.5), N,N-bis(2-hydroxyethyl)-2-aminoethanesulfonic acid (BES; pH range 6.4-7.8), 3-(N-morpholino)propanesulfonic acid (MOPS; pH range 6.5-7.9), 2-[[1,3-dihydroxy-2-(hydroxymethyl)propan-2-yl]amino]ethanesulfonic acid (TES; pH range 6.8-8.2), 2-[4-(2-hydroxyethyl)piperazin-1-yl]ethanesulfonic acid (HEPES; pH range 6.8-8.2), 3-(N,N-bis[2-hydroxyethyl]amino)-2-hydroxypropanesulfonic acid (DIPSO; pH range 7.0-8.2), 4-(N-morpholino)butanesulfonic acid (MOBS; pH range 6.9-8.3), and 3-[[1,3-dihydroxy-2-(hydroxymethyl)propan-2-yl]amino]-2-hydroxypropane-1-sulfonic acid (TAPSO; pH range 7.0-8.2). A particularly preferred buffer is MOPS with a preferred pH between 6 and 8, more preferably between 6.5 and 7.5.

In some embodiments, the third solution has a pH in the range of 1 and 10, preferably in the range between 3 and 9, and more preferably in the range between 6 and 8, and comprises a buffer, preferably MOPS.

In some embodiments of the present invention, the third solution comprises MOPS buffer and is preferably obtained by adjusting the pH of the MOPS buffer before adding a chelating agent, preferably EDTA.

Thus, in some embodiments of the present invention the third solution that comprises preferably EDTA as chelating agent for removing especially divalent cations such as magnesium cations further comprises MOPS buffer and has a pH between 6 and 8. In some embodiments of the present invention the third solution can be obtained by preparing a MOPS buffer, adjusting the pH of said MOPS buffer to a pH between 1 and 10, preferably between 6 and 8, and then adding EDTA as preferred chelating agent.

In some embodiments of the present invention the third solution comprises 40 mM MOPS and 10 mM EDTA and has a pH between 6 and 8, preferably between 6.5 and 7.5.

The method of purifying mRNA molecules according to the present invention further comprises as step (IIb) washing of the purified mRNA molecules obtained from step (IIa) using a fourth solution. The fourth solution can be any solution in which the mRNA molecules remain stable, i.e. do not hydrolyze. Step (IIb) is advantageous for removing the components of the third solution with said fourth solution comprising for example sodium chloride or citrate or being water.

As stated above, the second and the fourth solution can be any solution in which the mRNA molecules in which the mRNA molecules remain stable, i.e. do not hydrolyze. Such a fluid can be for example water, preferably nuclease free water or RNase-free water such as water for injection (WFI water). In case of the fourth solution such a fluid can further be for example HEPES buffered glucose, sodium chloride and/or citrate.

Thus, in some embodiments of the present invention the fourth solution is water.

In some embodiments of the present invention the second and the fourth solution are water.

In some embodiments of the present invention the fourth solution comprises sodium chloride and/or citrate.

In some embodiments of the present invention, the second solution is water and/or the fourth solution is water or comprises sodium chloride and/or citrate. This is advantageous for obtaining a solution comprising the purified mRNA molecules after step (IIb) without introducing components that would have to be removed in additional steps before further downstream processing or application.

In preferred embodiments of the present invention the second solution is water and the fourth solution comprises sodium chloride and/or citrate, preferably at a pH between 4 and 5. This is highly advantageous especially for therapeutically contexts as sodium chloride and/or citrate is preferably comprised in a pharmaceutical composition comprising the purified mRNA molecules. Thus, this is advantageous in view of a subsequent formulation of the obtained mRNA molecules into pharmaceutical compositions as sodium chloride and/or citrate are frequently used components of pharmaceutical compositions. Thus, using a fourth solution that comprises sodium chloride or citrate, which is a preferred component of pharmaceutical compositions allows for a time and cost efficient integration of steps required for purifying said mRNA molecules and formulating it into a pharmaceutical composition.

In case the fourth solution comprises sodium chloride and/or citrate, the pH of the fourth solution is preferably between 3 and 6, more preferably between 3.5 and 5.5, and even more preferably between 4 and 5.

In preferred embodiments of the method according to the present invention, ethanol is not comprised in any of the first, second, third, and/or fourth solution used in said method.

As stated above, it has surprisingly been found that by applying the method according to the present invention a high degree of purification of mRNA molecules can be obtained. Preferably, the solution obtained by performing said method comprises purified mRNA molecules but no or only very low levels of hydrolysis products and abortive mRNA molecules. More preferably the percentage of mRNA molecules is at least 80%, even more preferably at least 90%, even more preferably at least 95% of all the RNA molecules (mRNA molecules, hydrolysis product and abortive mRNA molecules) in the obtained solution after step (IIb). This can be measured by methods well-known to the person skilled in the art such as for example gel electrophoresis, high performance liquid chromatography (HPLC) analysis or by investigating electropherograms obtained by capillary gel electrophoresis or capillary electrophoresis such as Fragment Analyzer analysis. The latter approach is described exemplarily in more detail in the Examples below.

In some embodiments of the present invention, at least step (IIa), preferably steps (Ia) to (IIb), are performed at a temperature between 0° C. and 25° C., preferably between 2° C. and 8° C. Thus, the method according to the present invention is preferably performed between 0° C. and 25° C. at least in case of step (IIa), i.e. the purification of the mRNA molecules from the dissolved mRNA molecules obtained from step (Ib) using a third solution comprising a potent chelating agent, preferably EDTA. Thus, abortive mRNA molecules and hydrolysis products are removed by performing step (IIa) at a temperature between 0° C. and 25° C., preferably at a temperature between 2° C. and 8° C. Especially lower temperatures such as temperatures between 2° C. and 8° C. are advantageous as the amount of degradation of the mRNA molecules by hydrolysis is reduced compared to the amount of degradation that is observed upon performing especially step (IIa) at a higher temperature such as a temperature above 25° C. Thus, for obtaining high amounts of purified mRNA molecules it is advantageous to perform at least step (IIa), preferably at least steps (Ia) to (IIb) of the method according to the present invention at a temperature between 0° C. and 25° C., preferably between 2° C. and 8° C.

In some embodiments of the present invention, the precipitated mRNA molecules comprised in the suspension are obtained by in vitro transcription, preferably using a DNA template. Thus, the mRNA molecules to be purified according to the present invention can be produced by any method known in the art. Preferably, the mRNA molecules are transcribed in vitro using a DNA template.

In vitro transcription requires a purified linear or linearized DNA template containing a promoter, ribonucleotide triphosphates, a buffer system, and an appropriate RNA polymerase such as a T7 RNA polymerase. For example, such a purified linear DNA template can be chemically synthesized in vitro, optionally followed by template amplification using for example a PCR based method. Alternatively, a DNA template for transcription can be obtained from a DNA plasmid which is generally obtained by cell lysis, purified and linearized for example using a site-specific restriction enzyme. In both cases, the obtained linear DNA template sequence can be used for the in vitro transcription of mRNA molecules in the presence of A, C, G, and U nucleotides using standard lab protocols.

In some embodiments of the present invention the mRNA molecules to be purified are produced by in vitro transcription in the presence of unmodified and/or modified nucleotides. Thus, the mRNA molecules to be purified can be synthesized by in vitro transcription based on a linear or linearized DNA template by using unmodified and/or modified nucleotides. The term "unmodified nucleotide" used herein refers to A, C, G, T, and U nucleotides as described above. Particularly, in case of the in vitro transcription of an mRNA molecule said term refers to A, C, G, and U nucleotides. The term "modified nucleotide" used herein refers to any naturally occurring or chemically synthesized isomers of A, C, G, T, and U nucleotides as well as to any naturally occurring or chemically synthesized analogs, alternative or modified nucleotide or isomer thereof having for example chemical modifications or substituted residues. Modified nucleotides can have a base modification and/or a sugar modification. Modified nucleotides can also have phosphate group modifications, e.g., with respect to the five prime cap of an mRNA molecule. Modified nucleotides also include nucleotides that are synthesized post-transcriptionally by covalent modification of the nucleotides. Further, any suitable mixture of non-modified and modified nucleotides is possible. A non-limiting number of examples of modified nucleotides can be found in the literature (e.g. Cantara et al., Nucleic Acids Res, 2011, 39(Issue suppl_1):D195-D201; Helm and Alfonzo, Chem Biol, 2014, 21(2):174-185; Carell et al., Angew Chem Int Ed Engl, 2012, 51(29):7110-31) and some preferable modified nucleotides are mentioned exemplarily in the following based on their respective nucleoside residue:

1-methyladenosine, 2-methylthio-N6-hydroxynorvalyl carbamoyladenosine, 2-methyladenosine, 2'-O-ribosylphosphate adenosine, N6-methyl-N6-threonylcarbamoyladenosine, N6-acetyladenosine, N6-glycinylcarbamoyladenosine, N6-isopentenyladenosine, N6-methyladenosine, N6-threonylcarbamoyladenosine, N6,N6-dimethyladenosine, N6-(cis-hydroxyisopentenyl)adenosine, N6-hydroxynorvalyl-carbamoyladenosine, 1,2'-O-dimethyladenosine, N6,2'-O-dimethyladenosine, 2'-O-methyladenosine, N6,N6,2'-O-trimethyladenosine, 2-methylthio-N6-(cis-hydroxyisopentenyl)adenosine, 2-methylthio-N6-methyladenosine, 2-methylthio-N6-isopentenyladenosine, 2-methylthio-N6-threonyl carbamoyladenosine, N6-2-methylthio-N6-threonyl carbamoyladenosine, 2-methylthio-N6-(cis-hydroxyisopentenyl)adenosine, 7-methyladenosine, 2-methylthio-adenosine, 2-methoxy-adenosine, 2'-amino-2'-deoxyadenosine, 2'-azido-2'-deoxyadenosine, 2'-fluoro-2'-deoxyadenosine, 2-aminopurine, 2,6-diaminopurine, 7-deaza-adenosine, 7-deaza-8-aza-adenosine, 7-deaza-2-aminopurine, 7-deaza-8-aza-2-aminopurine, 7-deaza-2,6-diaminopurine, 7-deaza-8-aza-2,6-diaminopurine; 2-thiocytidine, 3-methylcytidine, N4-acetylcytidine, 5-formylcytidine, N4-methylcytidine, 5-methylcytidine, 5-hydroxymethylcytidine, 5-hydroxycytidine, lysidine, N4-acetyl-2'-O-methylcytidine, 5-formyl-2'-O-methylcytidine, 5,2'-O-dimethylcytidine, 2-O-methylcytidine, N4,2'-O-dimethylcytidine, N4,N4,2'-O-trimethylcytidine, isocytidine, pseudocytidine, pseudoisocytidine, 2-thio-cytidine, 2'-methyl-2'-deoxycytidine, 2'-amino-2'-deoxycytidine, 2'-fluoro-2'-deoxycytidine, 5-iodocytidine, 5-bromocytidine, 2'-azido-2'-deoxycytidine, 2'-amino-2'-deoxycytidine, 2'-fluor-2'-deoxycytidine, 5-aza-cytidine, 3-methyl-cytidine, 1-methyl-pseudoisocytidine, pyrrolo-cytidine, pyrrolo-pseudoisocytidine, 2-thio-5-methyl-cytidine, 4-thio-pseudoisocytidine, 4-thio-I-methyl-pseudoisocytidine, 4-thio-I-methyl-I-deaza-pseudoisocytidine, 1-methyl-I-deaza-pseudoisocytidine, 2-methoxy-cytidine, 2-methoxy-5-methyl-cytidine, 4-methoxy-pseudoisocytidine, 4-methoxy-I-methyl-pseudoisocytidine, zebularine,5-aza-zebularine, 5-methyl-zebularine, 5-aza-2-thio-zebularine, 2-thio-zebularine; 1-methylguanosine, N2,7-dimethylguanosine, N2-methylguanosine, 2'-O-ribosylphosphate guanosine, 7-methylguanosine, hydroxywybutosine, 7-aminomethyl-7-deazaguanosine, 7-cyano-7-deazaguanosine, N2,N2-dimethylguanosine, N2,7,2'-O-trimethylguanosine, N2,2'-O-dimethylguanosine, 1,2'-0-dimethylguanosine, 2'-O-methylguanosine, N2,N2,2'-O-trimethylguanosine, N2,N2J-trimethylguanosine, Isoguanosine, 4-demethylwyosine, epoxyqueosine, undermodified hydroxywybutosine, methylated undermodified hydroxywybutosine, isowyosine, peroxywybutosine, galactosyl-queuosine, mannosyl-queuosine, queuosine, archaeosine, wybutosine, methylwyosine, wyosine, 7-aminocarboxypropyldemethylwyosine, 7-aminocarboxypropylwyosine, 7-aminocarboxypropylwyosinemethylester, 7-deaza-guanosine, 7-deaza-8-aza-guanosine, 6-thio-guanosine, 6-thio-7-deaza-guanosine, 6-thio-7-deaza-8-aza-guanosine, 7-methyl-guanosine, 6-thio-7-methyl-guanosine, 7-methylinosine, 6-methoxy-guanosine, 1-methylguanosine, 8-oxo-guanosine, 7-methyl-8-oxo-guanosine, 1-methyl-6-thio-guanosine, N2-methyl-6-thio-guanosine, N2,N2-dimethyl-6-thio-guanosine, N1-methylguanosine, 2'-amino-3'-deoxyguanosine, 2'-azido-2'-deoxyguanosine, 2'-fluoro-2'-deoxyguanosine, 2-thiouridine, 3-(3-amino-3-carboxypropyl)uridine, 3-methyluridine, 4-thiouridine, 5-methyl-2-thiouridine, 5-methylaminomethyluridine, 5-carboxymethyluridine, 5-carboxymethylaminomethyluridine, 5-hydroxyuridine, 5-methyluridine, 5-taurinomethyluridine, 5-carbamoylmethyluridine, 5-(carboxyhydroxymethyl)uridine methyl ester, dihydrouridine, 5-methyldihydrouridine, 5-methylaminomethyl-2-thiouridine, 5-(carboxyhydroxymethyl)uridine, 5-(carboxyhydroxymethyl)-2'-O-methyluridine methyl ester, 5-(isopentenylaminomethyl)uridine, 5-(isopentenylaminomethyl)-2-thiouridine, 3,2'-O-dimethyluridine, 5-carboxymethylaminomethyl-2'-O-methyluridine, 5-carbamoylhydroxymethyluridine, 5-carbamoylmethyl-2'-O-methyluridine, 5-carbamoylmethyl-2-thiouridine, 5-methoxycarbonylmethyl-2'-O-methyluridine, 5-(isopentenylaminomethyl)-2'-O-methyluridine, 5,2'-O-dimethyluridine, 2'-O-methyluridine, 2'-O-methyl-2-thiorudine, 2-thio-2'-O-methyluridine, uridine 5-oxyacetic acid, 5-methoxycarbonylmethyluridine, uridine 5-oxyacetic acid methyl ester, 5-methoxyuridine, 5-aminomethyl-2-thiouridine, 5-carboxymethylaminomethyl-2-thiouridine, 5-methylaminomethyl-2-selenouridine, 5-methoxycarbonylmethyl-2-thiouridine, 5-taurinomethyl-2-thiouridine, pseudouridine, 1-methyl-3-(3-amino-3-carboxypropyl)pseudouridine, 1-methylpseudouridine, 3-methylpseudouridine, 2'-O-methylpseudouridine, 5-formyluridine, 5-aminomethyl-2-geranyluridine, 5-taurinomethyluridine, 5-iodouridine, 5-bromouridine, 2'-methyl-2'-deoxyuridine, 2'-amino-2'-deoxyuridine, 2'-azido-2'-deoxyuridine, 2'-fluoro-2'-deoxyuridine, inosine, 1-methylinosine, 1,2'-O-dimethylinosine, 2'-O-methylinosine, 5-aza-uridine, 2-thio-5-aza-uridine, 4-thio-pseudouridine, 2-thio-pseudouridine, 5-carboxymethyl-uridine, 1-carboxymethyl-pseudouridine, 5-propynyl-uridine, 1-propynyl-pseudouridine, 1-taurinomethyl-pseudouridine, 5-taurinomethyl-2-thio-uridine, 1-taurinomethyl-4-thio-uridine, 5-methyl-uridine, 1-methyl-pseudouridine, 4-thio-1-methyl-pseudouridine, 2-thio-1-methyl-pseudouridine, 1-methyl-1-deaza-pseudouridine, 2-thio-1-methyl-1-deaza-pseudouridine, dihydropseudouridine, 2-thio-dihydrouridine, 2-thio-dihydropseudouridine, 2-methoxyuridine, 2-methoxy-4-thio-uridine, 4-methoxy-pseudouridine, 4-methoxy-2-thio-pseudouridine, 1,2'-O-dimethyladenosine, 1,2'-O-dimethylguanosine, 1,2'-O-dimethylinosine, 2,8-dimethyladenosine, 2-methylthiomethylenethio-N6-isopentenyl-adenosine, 2-geranylthiouridine, 2-lysidine, 2-methylthio cyclic N6-threonylcarbamoyladenosine, 2-methylthio-N6-(cis-hydroxyisopentenyl) adenosine, 2-methylthio-N6-hydroxynorvalylcarbamoyladenosine, 2-methylthio-N6-threonylcarbamoyladenosine, 2-selenouridine, 2-thio-2'-O-methyluridine, 2'-O-methyladenosine, 2'-O-methylcytidine, 2'-O-methylguanosine, 2'-O-methylinosine, 2'-O-methylpseudouridine, 2'-O-methyluridine, 2'-O-methyluridine 5-oxyacetic acid methyl ester, 2'-O-ribosyladenosinephosphate, 2'-O-ribosylguanosinephosphate, 3,2'-O-dimethyluridine, 3-(3-amino-3-carboxypropyl)-5,6-dihydrouridine, 3-(3-amino-3-carboxypropyl)pseudouridine, 5,2'-O-dimethylcytidine, 5,2'-O-dimethyluridine, 5-(carboxyhydroxymethyl)-2'-O-methyluridine methyl ester, 55-(isopentenylaminomethyl)-2'-O-methyluridine, 5-aminomethyl-2-geranylthiouridine, 5-aminomethyl-2-selenouridine, 5-aminomethyluridine, 5-carbamoylmethyl-2'-O-methyluridine, 5-carboxyhydroxymethyluridine, 5-carboxymethyl-2- thiouridine, 5-carboxymethylaminomethyl-2-geranylthiouridine, 5-carboxymethylaminomethyl-2-selenouridine, 5-carboxymethylaminomethyl-2'-O-methyluridine, 5-cyanomethyluridine, 5-formyl-2'-O-methylcytidine, 5-methoxycarbonylmethyl-2'-O-methyluridine, 5-methylaminomethyl-2-geranylthiouridine, 7-aminocarboxypropyldemethylwyosine, 7-methylguanosine, 8-methyladenosine, N2,2'-O-dimethylguanosine, N2,7,2'-O-trimethylguanosine, N2,7-dimethylguanosine, N2,N2,2'-O-trimethylguanosine, N2,N2,7-trimethylguanosine, N2,N2,7-trimethylguanosine, N4,2'-O-dimethylcytidine, N4,N4,2'-O-trimethylcytidine, N4,N4-dimethylcytidine, N4-acetyl-2'-O-methylcytidine, N6,2'-O-dimethyladenosine, N6,N6,2'-O-trimethyladenosine, N6-formyladenosine, N6-hydroxymethyladenosine, agmatidine, 2-methylthio cyclic N6-threonylcarbamoyladenosine, glutamyl-queuosine, guanosine added to any nucleotide, guanylylated 5' end, hydroxy-N6-threonylcarbamoyladenosine; most preferably pseudo-uridine, N1-methyl-pseudo-uridine, 2'-fluoro-2'-deoxycytidine, 5-iodocytidine, 5-methylcytidine, 2-thiouridine, 5-iodouridine and/or 5-methyl-uridine.

Furthermore, the term "modified nucleotide" comprises nucleotides containing isotopes such as deuterium. The term "isotope" refers to an element having the same number of protons but different number of neutrons resulting in different mass numbers. Thus, isotopes of hydrogen for example are not limited to deuterium, but include also tritium. Furthermore, the mRNA molecule can also contain isotopes of other elements including for example carbon, oxygen, nitrogen and phosphor. It is also possible that modified nucleotides are deuterated or contain another isotope of hydrogen or of oxygen, carbon, nitrogen or phosphor.

Hence, in case the mRNA molecules to be purified are produced by in vitro transcription in the presence of four nucleotide types, i.e. A, C, G, and U nucleotides, the total number of modified nucleotide types can be 0, 1, 2, 3, or 4. Thus, in some embodiments, at least one nucleotide of one nucleotide type, e.g. at least one U nucleotide, can be a modified nucleotide. In some embodiments, at least one nucleotide of in total two nucleotide types, e.g. at least one U nucleotide and at least one C nucleotide, can be a modified nucleotide. In some embodiments, at least one nucleotide of in total three nucleotide types, e.g. at least one G nucleotide, at least one U nucleotide and at least one C nucleotide, can be a modified nucleotide. In some embodiments, at least one nucleotide of all four nucleotide types can be a modified nucleotide. In all these embodiments one or more nucleotides per nucleotide type can be modified, the percentage of said modified nucleotides of per nucleotide type being 0%, 2.5%, 5%, 7.5%, 10%, 15%, 20%, 25%, 30%, 35%, 40%, 45%, 50%, 55%, 60%, 65%, 70%, 75%, 80%, 85%, 90% or 100%.

In some embodiments, the total percentage of modified nucleotides comprised in the mRNA molecules to be purified is 0%, 2.5%, 5%, 7.5%, 10%, 15%, 20%, 25%, 30%, 35%, 40%, 45%, 50%, 55%, 60%, 65%, 70%, 75%, 80%, 85%, 90% or 100%.

The mRNA molecules to be purified can for example be characterized in that 0.5 to 50%, preferably 5 to 50% of the U nucleotides and 5 to 50% of the C nucleotides are modified. Said modified U nucleotides are preferably 5-ioduridine and said modified C nucleotides are preferably 5-iodcytidine.

In some embodiments, the mRNA molecules to be purified can be characterized in that 15 to 25% of the U nucleotides and 5 to 15% of the C nucleotides are modified, wherein said modified U nucleotides are preferably 5-methyluridine and said modified C nucleotides are preferably 5-iodcytidine.

In some embodiments, the mRNA molecules to be purified can be characterized in that 30 to 50% of the U nucleotides and 10 to 20% of the C nucleotides are modified, wherein said modified U nucleotides are preferably 5-ioduridine and said modified C nucleotides are preferably 5-iodcytidine.

In some embodiments, the mRNA molecules to be purified can be characterized in that 30 to 50% of the U nucleotides and 5 to 15% of the C nucleotides are modified, wherein said modified U nucleotides are preferably 5-ioduridine and said modified C nucleotides are preferably 5-iodcytidine.

In some embodiments, the mRNA molecules to be purified can be characterized in that 0.5 to 5% of the U nucleotides and 25 to 35% of the C nucleotides are modified, wherein said modified U nucleotides are preferably 2-thiouridine and said modified C nucleotides are preferably 5-methylcytidine.

The mRNA molecules to be purified can for example also be characterized in that 50 to 100%, preferably 100%, of the U nucleotides are modified. Said modified U nucleotides are preferably N1-methyl-pseudo-uridine.

In some embodiments of the present invention, the method comprises before step (Ia) a step of obtaining a suspension comprising precipitated mRNA molecules using ammonium acetate. Precipitation of mRNA molecules is advantageous for removing salts, nucleotides, and proteins, especially as mRNA precipitation is easy and cost effective. Different solutions are known to the person skilled in the art for precipitation comprising for example GSCN, NH$_4$OAc, ethanol, lithium chloride, sodium acetate, and sodium chloride. However, especially for therapeutic applications it is highly advantageous to avoid salts like GSCN and LDS. Hence, in some embodiments of the present invention mRNA molecules are precipitated using NH$_4$OAc. Thus, the suspension used in step (Ia) is preferably obtained using NH$_4$OAc for precipitating the mRNA molecules.

As stated above, in some embodiments of the present invention the first solution contains ammonium acetate. Preferably, the total amount of NH$_4$OAc in the suspension and the first solution is between 0.1 mol/l and 5 mol/l, preferably between 1 mol/l and 4 mol/l, more preferably between 2 mol/l and 3 mol/l, and thus less than 5 mol/l, preferably less than 4 mol/l, more preferably less than 3 mol/l. The low amount of ammonium acetate is highly advantageous in view of a time and cost efficient downstream processing. The first solution can further have a pH in the range of 1 to 12, preferably between 6.5 and 7.5.

In some embodiments of the present invention, the first solution contains ammonium acetate, wherein the total amount of NH$_4$OAc in the suspension and the first solution is between 1 mol/l and 4 mol/l, preferably between 2 mol/l and 3 mol/l.

In some embodiments of the present invention, the first solution has a pH in the range of 1 to 12, preferably between 6.5 and 7.5, and contains ammonium acetate, wherein the total amount of NH$_4$OAc in the suspension and the first solution is between 1 mol/l and 4 mol/l, preferably between 2 mol/l and 3 mol/l.

In some embodiments of the present invention, the method for purifying mRNA molecules further comprises adding a fifth solution to the dissolved mRNA molecules obtained from step (Ib) before purifying the mRNA molecules using a third solution comprising a chelating agent according to step (IIa). The fifth solution comprises preferably the same chelating agent as the third solution. Thus, the fifth solution comprises preferably EDTA as chelating agent for removing especially divalent cations such as magnesium cations, and optionally MOPS buffer. However, the concentration of the chelating agent comprised in the fifth solution is preferably higher than the concentration of the chelating agent comprised in the third solution. By adding the fifth solution to the dissolved mRNA molecules obtained from step (Ib) before performing step (IIa), the composition of the solution in which the mRNA molecules obtained from step (Ib) are suspended can be adjusted to the composition of the third solution used in step (IIa). This has the advantage that potential dilution effects can be reduced and thus, throughput and/or reproducibility of the mRNA molecule purification according to the method disclosed herein can be increased.

In some embodiments of the present invention, the method for purifying mRNA molecules further comprises dephosphorylating and/or polyadenylating and/or post-capping the mRNA molecules. Thus, mRNA molecules can not only be purified using the method of the present invention, but additionally be modified to ensure their ability to be translated into functional amino acid sequences such as proteins. Such modifications comprise dephosphorylation of the mRNA molecules to remove for example 5' mono-, di-, and/or triphosphates that are added during in vitro synthesis or transcription of the mRNA molecules and/or during co-transcriptional 5' capping; polyadenylation of the mRNA molecules as the poly(A) tail is a major determinant of the life time of an mRNA molecule in most cases; and post-capping of mRNA molecules in case co-transcriptional 5' capping is not performed. As especially 5' caps and 3' poly(A) tails are considered to be major determinants of mRNA efficiency, the incorporation of such features into an mRNA molecule purification method is advantageous in view of maximizing time and cost efficiency of the mRNA molecule processing and maximizing the duration of action of the purified mRNA molecules.

The presence of a 5' cap is advantageous for enhancing the stability of mRNA molecules and thus, for prolonging the duration of action of the mRNA molecules. Thus, in case the precipitated mRNA molecules to be purified do not comprise a 5' cap or a 5' cap analog, the mRNA molecules are preferably post-transcriptionally 5' capped, for example by enzymatic addition of a C1-m7G cap or an m7GpppG cap. However, more preferably the mRNA molecules are co-transcriptionally 5' capped, for example using an ARCA cap analogue or by applying Trilink technology (CleanCap technology; cf. US 2018/273576 A1). In this case, using the TFF method according to the present invention is advantageous for removing the clean cap analogue.

Furthermore, in case the precipitated mRNA molecules to be purified do not comprise a 3' poly(A) tail the mRNA molecules are preferably enzymatically polyadenylated with a poly(A) tail that consists of at least 100 A nucleotides, preferably of at least 120 A nucleotides, more preferably of at least 240 A nucleotides. Optionally, the poly(A) tail to be added comprises non-A nucleotides, preferably G nucleotides within the poly(A) tail sequence and/or at one end of the poly(A) tail, wherein said end is not to be added to the 3' end of the mRNA molecules to be purified. Adding a poly(A) tail to mRNA molecules has been found to be advantageous for prolonging the duration of action of said mRNA molecule and thus, for obtaining the desired levels of translation.

Hence, in some embodiments of the present invention, the method for purifying mRNA molecules according to the present invention further comprises dephosphorylating the mRNA molecules.

In other embodiments of the present invention, the method further comprises polyadenylating the mRNA molecules.

In yet other embodiments of the present invention, the method further comprises post-capping the mRNA molecules.

In some embodiments, the method for purifying mRNA molecules according to the present invention comprises at least dephosphorylating and polyadenylating the mRNA molecules.

In some embodiments, the method for purifying mRNA molecules according to the present invention comprises at least dephosphorylating and post-capping the mRNA molecules, wherein dephosphorylating the mRNA molecules is performed after post-capping the mRNA molecules.

In some embodiments of the present invention, the method for purifying mRNA molecules comprises dephosphorylating the mRNA molecules obtained from step (Ib), followed by performing steps (Ia) to (IIb), followed by polyadenylating the obtained mRNA molecules, followed by performing again steps (Ia) to (IIb), wherein the latter step (Ia) is preferably performed at a temperature between 20° C. and 30° C., preferably between 23° C. and 27° C., more preferably at 25° C., optionally followed by filtering the obtained retentate comprising the mRNA molecules. Thus, for maximizing cost and time efficiency of mRNA molecule processing the method for purifying mRNA molecules further comprises the steps of dephosphorylating and polyadenylating the mRNA molecules. In particular, it has been found to be advantageous to incorporate the latter two steps together with additional steps for purifying the mRNA molecules to remove also components introduced during dephosphorylation and polyadenylation.

Hence, especially in case the mRNA molecules to be purified comprise a co-transcriptionally added 5' cap or 5' cap analog, the method for purifying the mRNA molecules can comprise the following steps. First, the precipitated mRNA molecules are purified from a suspension that comprises said precipitated mRNA molecules using a first solution in step (Ia), said first solution preferably comprising ammonium acetate. The purified precipitated mRNA molecules are then in step (Ib) washed and dissolved using a second solution, preferably water, for removing for example proteins, salts, and nucleoside triphosphates. The dissolved mRNA molecules are then dephosphorylated by methods known to the person skilled in the art for removing 5' mono-, di-, and triphosphates from RNA molecules that might have been not capped. The dephosphorylated mRNA molecules are purified using the first solution, preferably comprising ammonium acetate, in a further step (Ia) and subsequently washed using the second solution, which is preferably water, in a further step (Ib). The thus obtained mRNA molecules are further purified in step (IIa) using a third solution comprising a chelating agent, preferably EDTA, and preferably MOPS at a pH between 0 and 8, more preferably at a pH between 6.5 and 7.5, for removing abortive mRNA molecules and hydrolysis products. The third solution is then removed by performing a washing step in step (IIb) using a fourth solution. If a polyadenylation step is not required, e.g. because a DNA template that comprises a sequence that encodes a poly(A) tail was used for in vitro transcription, the obtained purified mRNA molecules are washed in step (IIb) using a fourth solution, preferably comprising citrate and/or sodium chloride, and said step (IIb) is optionally followed by an additional filtration step using for example a filter membrane with a pore size of less than 0.3 µm. In case a polyadenylation step is advantageous, e.g. because a DNA template that does not comprise a sequence that encodes a poly(A) tail was used for in vitro transcription, the obtained purified mRNA molecules are washed in step (IIb) using a fourth solution, preferably water, and can then be elongated by enzymatically adding a 3' poly(A) tail using routine lab protocols for ensuring prolongation of action of the mRNA molecules, e.g. by adding poly(A) polymerase. The mRNA molecules are then subjected to steps (Ia) to (IIb) as described before, except that step (Ia) is preferably performed at a temperature between 20° C. and 30° C., preferably between 23° C. and 27° C., more preferably at 25° C., e.g. for removing added poly(A) polymerase, and except that the fourth solution used in step (IIb) preferably comprises citrate and/or sodium chloride, to obtain purified mRNA molecules comprising 5' caps or 5' cap analogs and 3' poly(A) tails. Optionally, the obtained purified mRNA molecules can be subjected to an additional filtration step using for example a filter membrane with a pore size of less than 0.3 µm.

In case the mRNA molecules to be purified do not comprise a co-transcriptionally added 5' cap or 5' cap analog, the method for purifying mRNA molecules according to the present invention can comprise an additional step of, preferably enzymatically, post-transcriptionally adding a 5' cap or a 5' cap analog compared to the procedure described above. Thus, the method for purifying the mRNA molecules can comprise the following steps. First, the precipitated mRNA molecules are purified from a suspension that comprises said precipitated mRNA molecules using a first solution in step (Ia), said first solution preferably comprising ammonium acetate. The purified precipitated mRNA molecules are then in step (Ib) washed and dissolved using a second solution, preferably water, for removing for example proteins, salts, and nucleoside triphosphates. The method then further comprises capping of the mRNA molecules obtained from step (Ib) followed by performing steps (Ia) and (Ib), dephosphorylating the obtained mRNA molecules, followed by performing steps (Ia) to (IIb). If a polyadenylation step is not required, e.g. because a DNA template that comprises a sequence that encodes a poly(A) tail was used for in vitro transcription, the obtained purified mRNA molecules are washed in step (IIb) using a fourth solution, preferably comprising citrate and/or sodium chloride, and said step (IIb) is optionally followed by an additional filtration step using for example a filter membrane with a pore size of less than 0.3 µm. In case a polyadenylation step is advantageous, e.g. because a DNA template that does not comprise a sequence that encodes a poly(A) tail was used for in vitro transcription, the obtained purified mRNA molecules are washed in step (IIb) using a fourth solution, preferably water, and can then be elongated by enzymatically adding a 3' poly(A) tail using routine lab protocols for ensuring prolongation of action of the mRNA molecules, e.g. by adding poly(A) polymerase. The mRNA molecules are then subjected to steps (Ia) to (IIb), wherein step (Ia) is preferably performed at a temperature between 20° C. and 30° C., preferably between 23° C. and 27° C., more preferably at 25° C., e.g. for removing added poly(A) polymerase, and wherein step (IIb) is performed using a fourth solution comprising preferably citrate and/or sodium chloride, optionally followed by filtering the obtained retentate comprising the mRNA molecules.

Hence, steps (Ia) to (IIb) are preferably performed before performing any elongation of mRNA molecules such as 3' polyadenylation and optionally 5' capping. In particular, steps (Ia) to (IIb) are preferably performed before 3' polyadenylation of mRNA molecules, and steps (Ia) to (Ib) are preferably performed before 5' capping.

This applies in all four embodiments described above, i.e. for the purification of mRNA molecules that are co-transcriptionally and post-transcriptionally 5' capped, respectively.

Further, in all four embodiments described above, the steps of dephosphorylating the mRNA molecules followed by performing steps (Ia) and (Ib) can be optional. Hence, some embodiments correspond to the four embodiments as described above except the steps of dephosphorylating the mRNA molecules followed by performing steps (Ia) and (Ib).

A TFF can be performed using as filter device a capsule, cassette and cassette holder, or hollow fiber module. Especially, hollow fiber modules allow for completely pre-assembled, pre-sterilized, disposable flow-paths that enable sterile processing and provide a cost effective method for packaging filter membranes.

Filter membranes used for mRNA molecule purification can be of any type of materials suitable for mRNA molecule purification and thus, not interacting with the mRNA molecules to be purified. Examples for materials of filter membranes include unmodified polyethersulfone (PES), modified polyethersulfone (mPES), mPES hollow fiber membrane, polyvinylidene fluoride (PVDF), cellulose acetate, nitrocellulose, mixed cellulose ester (ME), ultra-high MW polyethylene (UPE), polyfluorotetraethylene (PTFE), nylon, polysulfone (PS), polyacrilonitrile, polypropylene, polyvinyl chloride, polyvinylidene difluoride (PVDF), and combinations thereof.

Filter membranes are characterized by their molecular weight cut-off (MWCO) value, which refers to the lowest molecular weight of particles in daltons of which 90% are retained by the membrane. Preferably, a filter membrane has a pore size that is appropriate for retaining mRNA molecules while allowing components of smaller size than the MWCO and thus, the pore size, to pass through the filter membrane as permeate. As different components of different sizes have to be removed, it is advantageous to adjust the filter membrane pore size to the size of the components to be removed in the respective step of the method according to the present invention.

In some embodiments of the present invention, in case of step (Ia) a filter membrane with a molecular weight cut-off between 300 kDa and 0.65 µm is used for TFF, preferably of 500 kDa, and/or wherein in case of steps (Ib) and (IIb) a filter membrane with a molecular weight cut-off of between 1 kDa and 0.65 µm is used, preferably between 1 kDa and 300 kDa, more preferably between 1 kDa and 50 kDa, even more preferably of 50 kDa, 70 kDa, and/or 100 kDa, and/or wherein in case of step (IIa) a filter membrane with a molecular weight cut-off of at least 50 kDa, preferably of at least 70 kDa, is used, more preferably of 70 kDa or 100 kDa. The filter membrane used in TFF is crucial as the pore size of the filter membrane determines the size of particles such as mRNA molecules and components that can pass the filter membrane and are thus comprised in the permeate.

Thus, the MWCO of the filter membrane is preferably at least 300 kDa or 0.065 µm in case of step (Ia). Preferably, the MWCO is selected from the group consisting of 300 kDa, 500 kDa, 750 kDa, 0.05 µm, 0.1 µm, 0.2 µm, 0.45 µm, 0.5 µm, 0.65 µm, with an MWCO of 500 kDa being particularly preferred. This is advantageous for retaining precipitated mRNA molecules while removing for example enzymes and proteins comprised in cells that were lysed to obtain mRNA molecules to be purified or in case of in vitro transcribed mRNA molecules enzymes, modified and unmodified nucleosidtriphosphates, 5' caps, 5' cap analogs and buffer components comprised in in vitro transcription reaction mixtures. Thus, the appropriate MWCO value can be chosen by considering for example the size of the enzymes that were used in the preprocessing steps, such as the in vitro transcription of the mRNA molecules to be purified, and that are to be removed by TFF in step (Ia). The T7RNA polymerase is a well-known enzyme in the art that will not be efficiently removed in case of using a filter membrane having a MWCO of less than 100 kDa. When applying in step (Ia) an MWCO in the range of 1 kDa to 750 kDa the TFF can be referred to as ultrafiltration, whereas in case of applying an MWCO in the range of 0.05 µm to 0.65 µm the TFF can be referred to as microfiltration.

In case of steps (Ib) and (IIb), the MWCO is preferably at least 1 kDa, preferably between 1 kDa and 50 kDa, more preferably at least 50 kDa, and even more preferably at least 70 kDa. Preferably, the MWCO is selected from the group consisting of 1 kDa, 3 kDa, 5 kDa, 10 kDa, 30 kDa, 50 kDa, 70 kDa, 100 kDa, 300 kDa, 0.05 µm, 0.1 µm, 0.2 µm, 0.45 µm, 0.5 µm, and 0.65 µm, with an MWCO of 50 kDa, 70 kDa, or 100 kDa being particularly preferred. This is advantageous for purifying the mRNA molecules while efficiently removing salts and other components comprised in the respective solution such as ammonium acetate, chelating agents such as EDTA, buffer such as MOPS, abortive mRNA molecules and/or hydrolysis products. In case of comparatively large mRNA molecules a MWCO of more than 300 kDa might be considered as well.

In case of step (IIa), the MWCO is preferably at least 50 kDa, more preferably at least 70 kDa, even more preferably 70 kDa or 100 kDa. When using for example a MOPS-EDTA buffer as described above a MWCO of 100 kDa is particularly preferred. In case other potent chelating agents or other potent chelating agent—buffer combinations are applied even MWCO with 100 kDa and more can be considered for purification of comparatively large mRNA molecules.

Processes using TFF can furthermore be characterized in view of different variables with the two most important ones being the transmembrane pressure and the flow rate.

The "transmembrane pressure" (TMP) refers to the driving force that drives components through the filter membrane. In some embodiments, the transmembrane pressure is in case of steps (Ia) and (Ib), e.g. in a laboratory scale of 500 mg mRNA in the typical case, between 100 mbar and 500 mbar, preferably between 200 mbar and 400 mbar, and in case of steps (IIa) and (IIb) between 2 mbar and 20 mbar, preferably between 5 mbar and 15 mbar.

The term "flow" refers to the volume of solution flowing through a TFF system and especially in the filter membrane area with a "flow rate" referring to the solution volume flowing through said system during a given time. Thus the flow rate or crossflow velocity refers to the rate of a solution flow across the filter membrane. In some embodiments, the flow rate in case of steps (Ia) and (Ib) is, e.g. in a laboratory scale of 500 mg mRNA in the typical case, between 1.5 L/min and 2.5 L/min, preferably between 1.6 L/min and 1.9 L/min, and in case of steps (IIa) and (IIb) between 0.2 L/min and 0.6 L/min, preferably between 0.35 L/min and 0.45 L/min.

In particularly preferred embodiments of the present invention, the method for purifying mRNA molecules is performed using continuous TFF. Continuous TFF refers to a TFF system in which the retentate is used as feed for another round of TFF. Herein, the term "feed" refers to a solution or suspension comprising the mRNA molecules to be purified. Hence, the initial feed comprising the mRNA molecules and is subjected to a first round of filtration using TFF, and the obtained retentate comprising the mRNA molecules is used again as feed for another round of TFF by circulating at least the mRNA molecules. This is advantageous for enhancing the level of purification due to repeated steps of purification in an automated way while reducing the risk of losing mRNA molecules due to a transfer between systems.

Thus, in some embodiments of the present invention, the mRNA molecules are comprised in a retentate after tangential flow filtration, preferably at least in a retentate obtained by steps (Ia) to (IIa). In case of step (IIb), the mRNA molecules can be comprised in a retentate or a permeate.

In some embodiments, the mRNA molecules are comprised in the retentate obtained by steps (Ia) to step (IIb).

In some embodiments of the present invention, the retentate obtained in step (Ia) is used as feed solution for tangential flow filtration in step (Ib), the retentate obtained from step (Ib) as feed solution in step (IIa), and the retentate obtained from step (IIa) as feed solution in step (IIb). Thus, the present invention is preferably performed using continuous TFF for performing at least steps (Ia) to (IIb). More specifically, the mRNA molecules are preferably circulating in a continuous TFF system for purification according to the present invention. Thus, in one embodiment of the present invention at least steps (Ia) to (IIa), preferably steps (Ia) to (IIb), are performed using continuous TFF.

A further advantage of a TFF system is that it can be easily used for diafiltration and especially for continuous diafiltration. By diafiltration, parts of a solution or suspension can be exchanged by another. For example in discontinuous diafiltration, a solution is first diluted and then concentrated back to the starting volume. However, this can negatively affect the functionality of the mRNA molecules to be purified.

Hence, in preferred embodiments of the present invention, the mRNA molecules to be purified are circulating at least for steps (Ia) to (IIb) in a continuous TFF system for purification according to the method described above using constant volume diafiltration. Constant volume or continuous diafiltration refers to a filtration process, wherein a constant volume is retained in the filtration system. Thus, the same amount of solution or suspension is added as the volume of solution or suspension that passes the filter membrane as permeate. Thus, the volume of the retentate is the same as the volume that is initially fed into the TFF system, i.e. the feed volume, and the washing volume, i.e. diafiltration volume, is the same volume as the volume of the permeate. The combination of continuous TFF and continuous diafiltration is advantageous for removing contaminants as permeate while keeping the mRNA molecules to be purified in the circulating part of the TFF system at constant volume for preserving their function.

Hence, in some embodiments of the present invention at least steps (Ia) to (IIa), preferably steps (Ia) to (IIb), are performed using diafiltration, preferably continuous diafiltration.

In some embodiments of the present invention, the diafiltration volume of any of the first, second, third, and/or fourth solution is at least 1-fold the volume of the suspension of step (Ia), e.g. 1-fold, 2-fold, 3-fold, 4-fold, 5-fold, preferably at least 10-fold. Determining said diafiltration volume is of special interest in view of an optimal tradeoff between time and cost efficiency and the level of purification to be achieved. It has been found that the diafiltration volume of any of the first, second, third, and/or fourth solution is at least 1-fold the volume of the suspension of step (Ia), preferably at least 10-fold. This is advantageous to ensure a substantial removal of components while allowing high throughput processing and thus, the mRNA molecule purification on a large scale.

In some embodiments, the diafiltration volume is 1-fold the volume of the suspension of step (Ia) and thus, of the volume of the suspension comprising the precipitated mRNA molecules initially fed into the TFF system in step (Ia).

In some embodiments, the diafiltration volume is twice the suspension volume.

In some embodiments, the diafiltration volume is 3-fold the suspension volume.

In some embodiments, the diafiltration volume is 4-fold the suspension volume.

In some embodiments, the diafiltration volume is 5-fold the suspension volume.

In yet some embodiments, the diafiltration volume is at least 5-fold the suspension volume of step (Ia).

In some embodiments, the diafiltration volume is at least 10-fold the volume of the suspension of step (Ia) and thus, of the volume of the suspension comprising the precipitated mRNA molecules initially fed into the TFF system in step (Ia). It has been found that using a diafiltration volume of at least 10-fold the volume initially fed into the TFF system is advantageous to substantially remove the components aimed for at the respective step as described above.

Hence, it is preferred that the diafiltration volume of any of the first, second, third, and/or fourth solution is at least 10-fold the volume of the suspension of step (Ia). It is even more preferred that at least the diafiltration volume of the third and fourth solution is at least 10-fold the volume of the suspension of step (Ia).

In some embodiments, the diafiltration volume of the first, second, third, and fourth solution is at least 10-fold the volume of the suspension of step (Ia).

Figure 2:
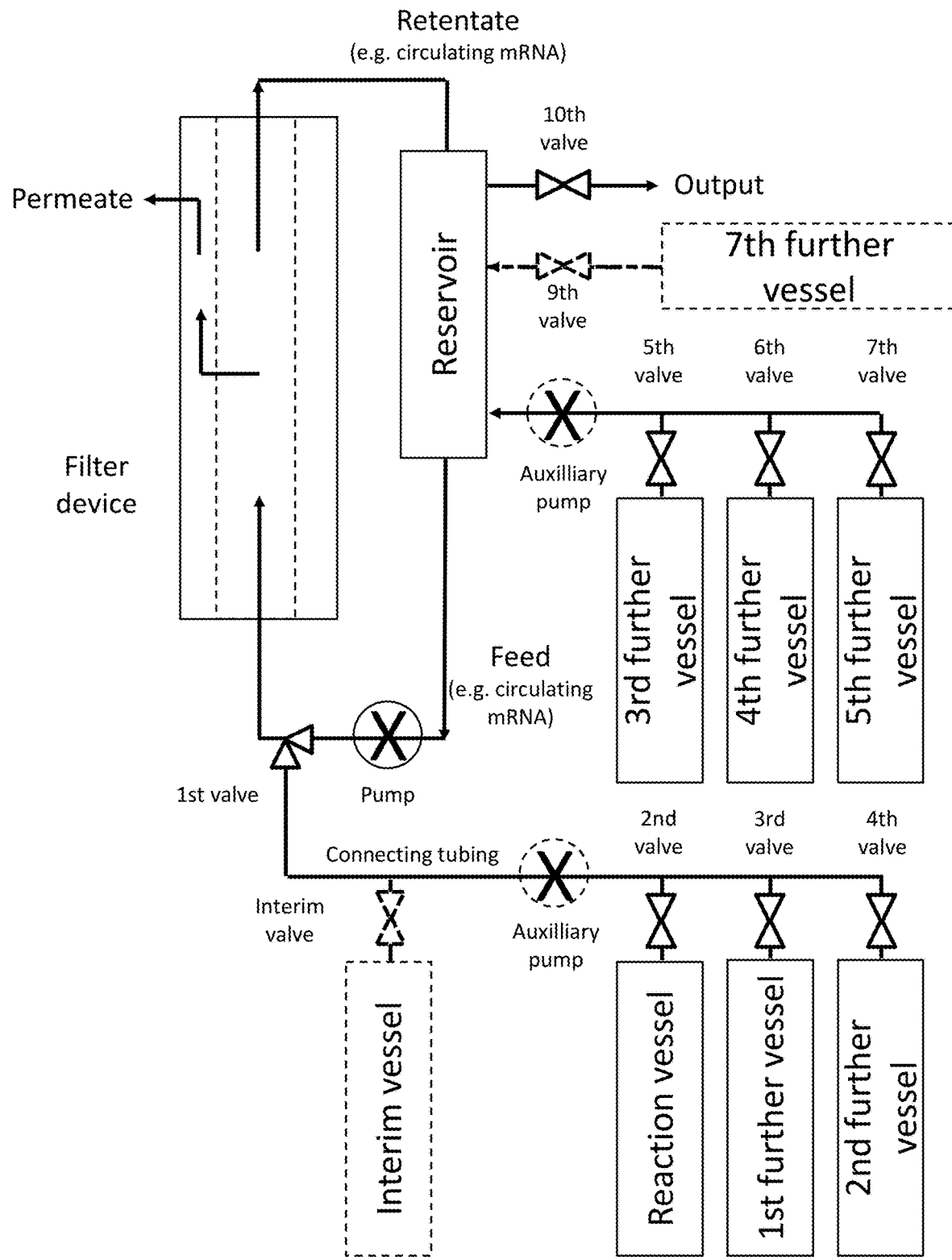

A fully automatable, closed system for obtaining purified mRNA molecules according to the method of the present invention is exemplarily shown in FIG. 2. The system comprises the continuous TFF system shown in FIG. 1 that is in fluid connection with an mRNA production system, preferably via a first valve. Of note, the term "valve" used herein encompasses valves, (e.g. two- and/or three-way) stopcocks, clamps, and MPC connectors; preferably valves and/or MPC connectors. Furthermore, it is preferred that an MPC connector is used in combination with a clamp. Thus, two elements, e.g. two tubings, can be connected in a manner that allows single-use, and/or ensures compatibility with various systems, stability against high pressure and/or pressure changes, e.g. in one of the tubings, and/or low costs.

The mRNA production system may comprise a reaction vessel and at least one further vessel. The reaction vessel and the at least one further vessel are preferably in fluid connection with each other and with the TFF system via a connecting tubing. The first valve is positioned between the connecting tubing of the mRNA production system and a tubing of the TFF system, preferably the tubing in which the feed circulates from the reservoir to the filter device. Alternatively, the mRNA production system can be in fluid connection with the tubing in which the retentate circulates from the filter device to the reservoir, or with the reservoir. Of note, the term "tubing" used herein can refer to a tubing, a tube, a pipe, or a combination thereof.

Furthermore, the connecting tubing of the mRNA production system may comprise an auxiliary pump. An auxiliary pump is advantageous for automatically adjusting velocities of fluids transferred through the connecting tubing. mRNA molecules to be purified according to the method of the present invention may be obtained, e.g., by cultivating cells for cellular mRNA molecule amplification or, preferably, by in vitro transcription (IVT). In case the mRNA molecules are obtained from cells, cells such as $E.\ coli$ cells may be cultivated in a fermenter under cell-specific cultivation conditions suitable for mRNA molecule production. Parameters of said cultivation conditions are preferably automatically regulated, for example by providing respective amounts of cultivation medium, gas and/or buffer. Hence, the mRNA production system may comprise a reaction vessel and at least one further vessel, wherein the reaction vessel is a fermenter and the at least one further vessel comprises for example a respective cultivation medium, gas and/or buffer solution. Alternatively, if the mRNA molecules to be purified are obtained by IVT, an IVT template, e.g. a respective DNA template for IVT of the target mRNA molecule to be purified, and IVT reagents such as an enzyme for IVT, e.g. a T7 RNA polymerase, and a mixture of NTPs are required. Hence, the mRNA production system may comprise a reaction vessel and at least one further vessel, wherein the at least one further vessel comprises at least one of said IVT reagents.

Thus, the reaction vessel is preferably in fluid connection with at least a further vessel, preferably at least a first further vessel and a second further vessel.

The first further vessel may comprise at least one of said IVT reagents and is preferably in fluid connection with the reaction vessel via the connecting tubing and a second and a third valve. The second valve is preferably positioned between the reaction vessel and the connecting tubing, and the third valve between the connecting tubing and the first further vessel. By closing the first valve and opening the second and the third valve, mRNA molecules can be produced, e.g. by IVT, preferably within the reaction vessel. By closing the third valve, and opening the first and the second valve, the produced mRNA molecules can be transferred from the mRNA production system to the TFF system.

The second further vessel may comprise a solution for precipitating mRNA molecules, wherein said solution comprises preferably ammonium acetate ($NH_4OAc$), e.g. 5 M $NH_4OAc$. Preferably, the second further vessel is in fluid connection with the connecting tubing via a fourth valve. By opening the second and the fourth valve and closing the first and the third valve, target molecules can be precipitated, preferably in the reaction vessel or, in case the reaction vessel is a fermenter, in the second further vessel. Upon opening then the first valve, precipitated mRNA molecules in suspension can be transferred from the mRNA production system to the TFF system for mRNA molecule purification according to the method of the invention.

Therefore, the system shown in FIG. 2 comprises a TFF system, preferably a continuous diafiltration system, with a reservoir. Preferably, the reservoir is in fluid connection with at least three further vessels, i.e. at least a third further vessel, a fourth further vessel and a fifth further vessel, via at least a fifth, sixth, and seventh valve, respectively. The third further vessel may comprise the first solution, the fourth further vessel the second solution, and the fifth further vessel the third solution according to the present invention.

If the second and the fourth solution differ from each other, the reservoir is preferably in fluid connection with a sixth further vessel comprising the fourth solution, e.g., via an eighth valve. Hence, it is preferred that the third further vessel comprises the first solution, wherein the first solution comprises $NH_4OAc$, e.g. 2.5 M $NH_4OAc$, for purifying precipitated mRNA molecules, the fourth further vessel water, e.g. water for injection (WFI) as the second solution, the fifth further vessel the third solution, wherein the third solution comprises EDTA as chelating agent and optionally MOPS. In case the fourth solution is not water, the sixth further vessel preferably comprises sodium chloride and/or citrate. Furthermore, an auxiliary pump might be present for automatically adjusting velocities of fluids transferred from any of said at least three further vessels to the reservoir.

Hence, the reservoir preferably comprises precipitated mRNA molecules in suspension that have been transferred from the mRNA production system via the first valve by opening the first valve for a predetermined amount of time. By opening the fifth valve for a predetermined amount of time, the first solution can be added to the precipitated mRNA molecules in suspension and the mixture may then be transferred for at least one round of continuous TFF to the filter device, wherein the filter membrane has preferably a molecular weight cut-off between 300 kDa and 0.65 µm. Thus, the suspension comprising the precipitated mRNA molecules can be purified, e.g. from components from IVT mixtures such as proteins, salts, and/or NTPs according to step (Ia) of the method disclosed herein. The suspension comprising the purified precipitated mRNA molecules is preferably transferred back to the reservoir as retentate. For performing step (Ib) and thus, for washing and dissolving the purified precipitated mRNA molecules obtained from step (Ia), the sixth valve is opened for a predetermined amount of time. Thus, the second solution can be added to the suspension comprising the precipitated mRNA molecules in the reservoir. By performing at least one round of continuous TFF using the filter device, preferably with a filter membrane having a molecular cut-off between 1 kDa and 0.65 µm, e.g. $NH_4OAc$ comprised in the first solution can be removed. By opening the seventh valve for a predetermined amount of time, the third solution can then be added to the washed and dissolved mRNA molecules in the reservoir. By performing at least one round of continuous TFF using the filter device, wherein the filter membrane has preferably a molecular weight cut-off of 50 kDa, more preferably of 100 kDa, abortive mRNA molecules and mRNA molecule hydrolysis products can be efficiently removed according to step (IIa) of the method disclosed herein. For washing the purified mRNA molecules obtained from step (IIa), e.g. by removing components of the third solution, step (IIb) can then be performed. Therefore, either the sixth or eight valve is opened for a predetermined amount of time for adding either water or the fourth solution comprising sodium chloride and/or citrate to the purified mRNA molecules for at least one round of continuous TFF using the filter device comprising a filter membrane, preferably with a molecular weight cut-off of 50 kDa.

Optionally, a further step is performed between step (Ib) and (IIa). Therefore, the TFF system may further comprise a seventh further vessel that is in fluid connection, e.g., with the reservoir, preferably via a ninth valve. Said seventh further vessel may comprise the fifth solution, wherein the fifth solution comprises preferably at least the chelating agent of the third solution, preferably EDTA, in a higher concentration as said third solution. By opening the ninth valve for a predetermined amount of time after performing step (Ib), the fifth solution can be added to the mRNA molecules dissolved in the second solution. This has the advantage that throughput and reproducibility of the method of the invention can be increased by reducing the time that is required for adjusting the concentration of at least the chelating agent in the TFF system to the respective concentration as specified herein for the third solution. Furthermore, an auxiliary pump might be present for automatically adjusting velocities of fluids transferred from the seventh further vessel to the reservoir (not shown).

Optionally, the mRNA molecule production system may further comprise an interim vessel, preferably in fluid connection with the connecting tubing of the mRNA molecule production system, preferably via an interim valve. The interim vessel may be a, preferably sterile, bag. By opening the first valve and the interim valve for a predetermined amount of time, at least a fraction of the suspension or solution comprising the mRNA molecules can be transferred from the TFF system to the mRNA molecule production system and/or from the mRNA molecule production system to the TFF system. This can be advantageous for storing at least a fraction of said suspension or solution, preferably for a predetermined amount of time. Thus, at least said fraction of said suspension or solution can be objected to a further round of purification, e.g. steps (Ia) and (Ib), steps (IIa) and (IIb), and/or a combination thereof. Furthermore, during storage of at least a fraction of the suspension or solution in the interim vessel, the TFF system and/or the mRNA molecule production system can be cleaned, washed with water and/or buffer, and/or sterilized. Optionally or alternatively, the interim vessel may be used for obtaining at least a fraction of the solution or suspension comprised in the interim vessel, preferably the solution or suspension comprising the purified mRNA molecules. Optionally, the system may further comprise a filter for a further filtration step (not depicted). Said filter may comprise a filter membrane with a pore size of less than 0.3 µm, e.g. of 0.22 µm, for a final filtration step and thus, may be useful for a final filtration of suspension comprising the purified mRNA molecules as obtained from the interim vessel.

It might be advantageous to modify the mRNA molecules to be purified, e.g. by dephosphorylating, adding a 5' cap and/or a 3' poly(A) tail. In particular, steps (Ia) to (IIb) are preferably performed at least once before 3' polyadenylation of mRNA molecules, and steps (Ia) to (Ib) are preferably performed at least once before 5' capping. Optionally, obtained mRNA molecules may be dephosphorylated after at least a first step (Ia) and at least a first step (Ib) followed by at least a second step (Ia) and at least a second step (Ib). Therefore, the system may further comprise one or more of the following (not depicted): a second' further vessel, preferably comprising reagents required for capping and preferably in fluid connection with the connecting tubing of the mRNA production system via a fourth' valve, a second" further vessel, preferably comprising reagents required for dephosphorylation and preferably in fluid connection with the connecting tubing of the mRNA production system via a fourth" valve, and a second'" further vessel, preferably comprising reagents required for enzymatically adding a poly(A) tail, e.g. at least a poly(A) polymerase, and preferably in fluid connection with the connecting tubing of the mRNA production system via a fourth'" valve. By opening the first valve and the interim valve for a predetermined amount of time, at least a fraction of the respective suspension comprising the mRNA molecules to be purified can be transferred from the TFF system into the interim vessel of the mRNA production system. By closing the first valve and opening the fourth', fourth", and/or fourth'" valve, capping, dephosphorylation, and/or polyadenylation of the mRNA molecules can be performed, preferably in the interim vessel. Alternatively or additionally, in case the reaction vessel is not a fermenter, the reaction vessel can be used instead of the interim vessel and thus, the second valve instead of the interim valve is opened. By closing the fourth', fourth", and/or fourth'" valve and opening the first valve, the suspension comprising the modified mRNA molecules can be transferred from the mRNA molecule production system to the TFF system.

Of note, the filter device may comprise more than one filter membrane which can be exchanged automatically. Preferably, the filter device comprises more than one filter device unit, e.g. each comprising a filter column, and the mRNA molecules are transferred for continuous TFF to at least one of the units having a filter membrane with a molecular weight cut-off as specified above for the respective method step.

Furthermore, as depicted in FIG. 2, the system may comprise an output, e.g. an output vessel in fluid connection with the reservoir, e.g., via a tenth valve. Preferably, said output vessel refers to or is in fluid connection with a sterile, preferably single use, bag for storing at least a fraction of the solution or suspension comprising the purified mRNA molecules. By opening the tenth valve, purified mRNA molecules can be obtained. Alternatively, in (the last performed) step (IIb) the purified mRNA molecules may be comprised in the permeate rather the retentate. Optionally, the system may further comprise a filter for a further filtration step (not depicted). Said filter may comprise a filter membrane with a pore size of less than 0.3 μm, e.g. of 0.22 μm, for a final filtration step and thus, may be useful for a final filtration of suspension comprising the purified mRNA molecules, e.g. the permeate or as obtained from the output vessel. Furthermore, an auxiliary pump might be present for automatically adjusting velocities of fluids transferred from the reservoir to the output (not shown).

The system may further comprise a, preferably automatically regulated, cooling and/or heating element (not shown). Said cooling and/or heating element may be positioned at least partially around one or more of the tubings, vessels (e.g. reaction vessel, interim vessel, further vessel, and/or reservoir), and/or the filter device. Preferably, a cooling element is positioned at least partially around the reservoir and/or the filter device. Thus, the method according to the present invention can be performed at a temperature between 0° C. and 25° C., preferably for most steps between 2° C. and 8° C. by controlling the respective cooling and/or heating element. Thus, high amounts of purified mRNA molecules can be obtained.

Preferably, the system may further comprise an, preferably automatically regulated, element for pH regulation (not shown). Said element may comprise a device for measuring pH of a solution and/or suspension, such as a pH meter, and optionally a pH regulation vessel, wherein the latter is preferably in fluid connection with at least one of the vessels (e.g. reaction vessel, interim vessel, further vessel, and/or reservoir). Thus, the pH of the solution or suspension in the respective vessel can be measured and/or controlled. Additionally or alternatively, pH of the permeate can be measured, preferably continuously. Thus, the mRNA purification process can be monitored and quality-checked.

Furthermore, nucleic acid concentration and/or purity can be measured, preferably using the permeate. This can be done for example photometrically by measuring the absorbance of molecules including mRNA molecules in the UV range at about 260 and 280 nm. For example, a quotient of a value obtained at about 260 nm to a value obtained at about 280 nm can be indicative for the purity of the respective nucleic acid in a solution or suspension. For example, a ratio of about 1.8 to about 2.0 can be indicative for DNA or RNA molecules of high purity, whereas for example a ratio of less than 1.8 may be indicative for impurities, e.g. by proteins. Thus, information about the composition, e.g., of the permeate may be obtained, including mRNA molecule concentrations. Optionally or alternatively, mRNA molecule concentration may be determined based on a, preferably continuous, conductivity measurement. Thus, the system may further comprise an, preferably automatically regulated, element for nucleic acid quantification (not shown) such as a spectrometer and/or a spectrophotometer, e.g. a nanodrop, and/or means for performing a conductivity measurement.

Any one of the vessels (e.g. reaction vessel, interim vessel, further vessel, and/or reservoir) or all vessels can be positioned on a respective balance. Thus, the weight of the respective vessel can be measured, the weight of the solution or suspension comprising the mRNA molecules to be purified or purified in the respective vessel can be determined, and the appropriate amount of a respective solution or component added, e.g. of the first, second, third, fourth, and/or fifth solution, and/or IVT reagents. Thus, the mRNA production and/or purification process can be optimized and automized.

For ensuring an automatic regulation of the mRNA production and/or purification process, the system preferably comprises control means adapted for controlling the means mentioned above, e.g. valves, (auxiliary) pumps, a heating and/or cooling element, an element for pH regulation, an element for nucleic acid quantification, means for performing a conductivity measurement, and/or a balance. Herein, the term "system" is meant to be understood as device and can be used interchangeable therewith.

As regards the connecting tubing of the mRNA molecule production system, said connecting tubing may be a connecting tubing as depicted in FIG. 2, e.g. fluidly connecting reaction vessel and further vessels in series. Alternatively, the connecting tubing may refer to two or more tubings connecting respective vessels. Thus, the connecting tubing may, for example, refer at least to a first tubing fluidly connecting the reaction vessel and the first further vessel and a second tubing fluidly connecting the reaction vessel and the second further vessel. Preferably, one or more of said two or more tubings comprise a valve between the respective vessels and, optionally an auxiliary pump.

Any one of the components of the system described above can be a single use component. Preferably, one or more of the vessels (e.g. interim, reaction, and/or further vessel) and/or one or more of the (interim) valves can be a respective single use vessel and valve, respectively. Preferably, the interim vessel and/or the reaction vessel is a respective single use vessel. Optionally, the whole system may be a system for single use, for example for the production and purification of a specific mRNA molecule. This has the advantage that the respective mRNA molecule can be produced and purified under sterile conditions while avoiding time and cost consuming washing, cleaning, and/or sterilization steps that would otherwise be required to reduce the risk of contamination. Thus, preferably one or more components of the system described above are respective single use components.

A system as shown exemplarily in FIG. 2 has several advantages. In such a closed system the risk of contaminations, e.g. by RNase is minimized, while at the same time throughput can be increased as clogging of filter membranes can be avoided using continuous TFF. Furthermore, such a system is easy handleable, e.g. via a pump-regulated fluid transfer, and even fully automatable, e.g. by automatically regulating the (auxiliary) pumps and/or valves. Moreover, it is easily scalable and well adjustable according to customer specific requirements. Thus, high-throughput purification of mRNA molecules can be performed in a highly efficient and automated manner according to the disclosed method using a system as shown in FIG. 2.

The present invention further relates to a method for producing a pharmaceutical composition comprising (a) purifying mRNA molecules according to the method of purifying mRNA molecules described above, and (b) formulating the thus obtained mRNA molecules into a pharmaceutical composition. This is of special interest for the application of purified mRNA molecules in pharmaceutical contexts such as the administration of mRNA molecules to allow for the synthesis of a protein, a deficit or defect of which is associated with a disease and/or the presence of which is needed or beneficial in a cell.

Preferably, the function of the amino acid sequence, which can be translated from the mRNA molecule purified according to the present invention, in the cell or in the vicinity of the cell is needed or beneficial, e.g. an amino acid sequence the lack or defective form of which is a trigger for a disease or an illness, the provision of which can moderate or prevent a disease or an illness, or an amino acid sequence which can promote a process which is beneficial for the body, in a cell or its vicinity. The encoded amino acid sequence can be the complete amino acid sequence or a functional variant thereof. Further, the encoded amino acid sequence can act as a factor, inducer, regulator, stimulator or enzyme, or a functional fragment thereof, where this amino acid sequence is one whose function is necessary in order to remedy a disorder, in particular a metabolic disorder or in order to initiate processes in vivo such as the formation of new blood vessels, tissues, etc. Here, functional variant is understood to mean a fragment which in the cell can undertake the function of the amino acid sequence whose function in the cell is needed or the lack or defective form whereof is pathogenic.

Preferably, such an amino acid sequence is advantageous with respect to applications in supplemental or medical purposes to generate or regenerate physiological functions caused by suboptimal amino acid sequence biosynthesis and thus also to favorably influence directly or indirectly the course of diseases. Disorders with known genetic base are for example cystic fibrosis, haemophilia, hypertension, elevated cholesterol level, cancer, neurodegenerative disorders, mental illness and others. An online catalogue with presently 22,993 entries of Human Genes and Genetic Disorders together with their respective genes and a description of their phenotypes are available at the ONIM (Online Mendelian Inheritance in Man) webpage (http://onim.org); sequences of each are available from the Uniprot database (http://www.uniprot.org). As non-limiting examples, the following Table 2 lists some congenital diseases, and the corresponding gene(s). Due to the high degree of interaction of cellular signalling pathways, the mutation of a certain gene causes a multiply of pathogenic symptoms, of which only a characteristic one is listed in Table 2.

The protein can also have the potential to induce an immunogenic reaction acting, e.g., as an antigen. Such proteins lend themselves to applications in supplemental or medical purposes including vaccination.

TABLE 2

| Disease | Pathology | Gene, heredity |
|---|---|---|
| Blood diseases | | |
| Fanconi Anemia | Anemia and neutropenia, evidence that a DNA repair mechanism is affected | FANCA, autosomal recessive |
| Hemophilia-A | Abnormal bleeding | Coagulation Factor VIII, X-chromosomal recessive |
| Hemophilia-B | Abnormal bleeding | Coagulation Factor IX, X-chromosomal recessive |
| Hereditary Spherocytosis (various types) | spherical-shaped erythrocytes (spherocytes) | Ankyrin (ANK1) |
| Paroxysmal nocturnal hemoglobinuria | Anemia and presence of blood in the urine | PIG-A, X-chromosomal |
| Porphyria cutanea tarda | Overproduction of heme, iron overload | Uroporphyrinogen decarboxylase (UROD), autosomal recessive |
| Severe combined immune deficiency (SCID) | Due to impaired DNA synthesis severe immune deficiency in humoral and cellular immunity | Adenosine deaminase, autosomal recessive, IL-2R-γ, JAK3, (IL-7R-α, RAG1/2, Artemis, CD3δ, CD3ε |
| Sickle-cell anemia | Abnormal hemoglobin (HbS) | β-Hemoglobin (HB), autosomal recessive |
| Thalassemia (α- and β form) | Lack of α- or β hemoglobin resulting in anemia | Deletion of HBA1 and/or HBA2, |
| Von Willebrand disease (three types known, Type-III is most severe) | Abnormal bleeding, hemorrhage similar to hemophilia A and B | Autosomal dominant and recessive forms |

TABLE 2-continued

| Disease | Pathology | Gene, heredity |
|---|---|---|
| Cancer | | |
| Malignant melanoma | P16 mutation leads to uncontrolled proliferation of fibroblasts | Cyclie dependant kinase inhibitor 2 (CDKN2) |
| Neurofibromatosis (2 types) | Benign tumors on auditory nerves leads to deafness | NF1, NF2, autosomal dominant |
| Deafness (Ear) | | |
| Deafness | Hearing loss | Deafness-1A (DFNB1), autosomal recessive |
| Pendred syndrome | Hearing loss | Pendrin (PDS), autosomal recessive |
| Heart | | |
| Ataxia telangiectasia | DNA damage repair disturbed, | ATM, |
| Atherosclerosis | Increase of blood cholesterol | apoE, |
| LQT Syndrome (Long QT) | Potassium channel defect | LQT1 and other genes |
| Von-Hippel Lindau Syndrome | Abnormal growth of blood vessels, can lead to cancer | VHL, autosomal dominant |
| William's Beuren Syndrome | Deletion of elastin results in vascular defects, supravalvular aortic stenosis | Deletion of elastin and LIM kinase genes |
| Metabolic disorders and glycogen storage diseases | | |
| Adrenoleukodystrophy | Disturbed fatty acid transport and metabolism | ABCD1, X-chromosomal |
| Alkaptonuria | Nitrogen metabolism defect, Urine turns dark when exposed to oxygen | Homogentisic Oxidase, autosomal recessive |
| Diabetes type I | Disturbed insulin production | IDDM1, IDDM2, GCK, . . . |
| Galactosemia | disorder of galactose metabolism | Galactose-1-phosphate uridyltransferase gene (GALT), autosomal recessive |
| Gauche disease | Disturbance of fat metabolism | Glucocerebrosidase |
| Glucose Galactosidase Malabsorption | Disturbed glucose and galactose transport out of the intestinal lumen resulting in diarrhea | SGLT1, autosomal recessive |
| Glycogen storage disease Type I, Von-Gierke's disease | Accumulation of glucose in liver and kidney | Glucose-6-Phosphatase, autosomal recessive |
| Glycogen storage disease Type II, Pompe's disease | Accumulation of glycogen in liver, heart, skeletal muscle, cardiomegaly | α-1-Glucosidase, autosomal recessive |
| Glycogen storage disease Type III, Cori's disease | Accumulation of glycogen in liver, heart, skeletal muscle, hepatoomegaly | Debranching enzyme, autosomal recessive |
| Glycogen storage disease Type V, McArdle's disease | Cannot utilize glycogen in muscle cells | Muscle phosphorylase, autosomal recessive |
| Glucose-6-Phosphate Dehydrogenase | Inability to maintain glutathione leads to hemolytic anemia | G6PD, X-chromosomal recessive |
| Hereditary Hemochromatosis (4 types) | Excess of iron in the body (esp. liver) due to excessive iron absorption in the gut | Hemochromatosis (HFE) |
| Homocystinuria | Nitrogen metabolism defect | Cystathione synthetase defect, autosomal recessive |
| Lesh Nyhan Syndrome | Accumulation of uric acid leading to gout, ureate stones and muscle loss | HPRT1, X-chromosomal |
| Maple Syrup Urine Disease | Amino acid metabolism defect leads to the accumulation of α-Ketoacides and death in the first months if untreated | Branched-chain-alpha-dehydrogenase (BCKDH) |

TABLE 2-continued

| Disease | Pathology | Gene, heredity |
|---|---|---|
| Menkes' Syndrome | Reduced ability to absorb copper, leads to death in infancy if untreated | ATP7A, X-chromosomal recessive |
| Obesity | Elevated body weight | Polygenic, elevated leptin levels may play a role |
| Phenylketonuria | Inability to break down Phenylalanine into tyrosine leads to mental retardation | Phenylalanine hydroxylase (PAH), autosomal recessive |
| Tangier disease | reduced levels of plasma high density lipoproteins | ATP-binding cassette-1 gene (ABCA1) |
| Zellweger Syndrome (leads to death in infants) | High levels of iron and copper in the blood | PXR1 (receptor on the surface of peroxisomes) |
| Wilsons Disease | Copper accumulation in brain and liver | ATP7B (P-type ATPase), autosomal recessive |
| Musculoskeletal system | | |
| Achondroplasis | Short stature with a large head due to slow proliferation of chondrocytes | Fibroblast growth factor receptor 3 (FGF3R), |
| Charcot-Marie-Tooth Syndrome and its more severe form Dejerine-Sottas Syndrome | Degeneration of the muscles in limbs | Different forms caused by different gene mutations, autosomal recessive and X-chromosomal |
| Cockayne syndrome (2 types) | Premature aging and short stature, loss of "on the fly" DNA repair | group 8 excision repair cross-complementing protein (ERCC8) |
| Chondroectodermal dysplasia | Malformation of bones and polydactyly | EVC, autosomal recessive |
| Diastrophic dysplasia (DTD) | Malformed hands, sulfate transporter defect | DTDST gene |
| Duchenne muscular dystrophy | Enlargement of muscle tissue with subsequent loss of function | DMD, X-chromosomal recessive |
| Fibrodysplasia Ossificans Progressiva | Heterotopic bone formation | NOG, BMP, Autosomal dominant |
| Friedreich's ataxia | Heart enlargement and progressive loss of muscular coordination | Frataxin, autosomal recessive |
| Hypophosphatasia | Production of an abnormal version of alkaline phosphatase affecting the mineralization process | ALPL, autosomal recessive |
| Marfan Syndrome | Connective tissue disorder due fibrillin deficiency | Fibrillin 1 (FBN), autosomal dominant |
| Myotonic dystrophy (onset during young adulthood) | Protein kinase defect in skeletal muscle cells | Dystrophia myotonica protein kinase (DMPK), autosomal dominant |
| Osteogenesis imperfect (various types) | Defect in type-I collagen formation leads to multiple fractures after birth | COL1A1, COL1A2 |
| Prader-Willi Syndrome | Decreased muscle tone and mental retardation | SNRPN (small ribonucleoprotein N) deleted due to a deletion on chromosome 15 |
| Neurons and Brain | | |
| Alzheimer disease | Increased amyloid production, progressive inability to remember facts | Polygenic, PS1, PS2, . . . |
| Amyotrophic lateral sclerosis (ALS) (various forms) | Progressive degeneration of motor neuron cells (defect in elimination superoxide radicals) | Superoxide dismutase 1 (SOD1), various genes involved |
| Angelman syndrome | Mental retardation with inadequate laughing | Genomic imprinting on chromosome 15 |
| Pyruvat dehydrogenase | Neurological defects if untreated | Pyruvat dehydrogenase, autosomal recessive |
| Refsum disease | Accumulation of phytanic acid leads to peripheral neuropathy | Phytanoyl-CoA hydroxylase (PHYH), autosomal recessive |

TABLE 2-continued

| Disease | Pathology | Gene, heredity |
| --- | --- | --- |
| Rett's syndrome | Mental retardation with arrested development between 6 and 18 months of age | Methyl-CpG-binding protein-2 (MECP2), X-chromosomal dominant |
| Tay-Sachs disease (various forms of severity) | Disturbed break down of GM2 ganglioside leads to neurological damage | HEXA β-hexosaminidase A), autosomal recessive |
| LaFora Disease | Aggressive form of epilepsy | EPM2A, autosomal recessive |
| Essential tremor (variable forms) | Uncontrollable shaking | ETM1, ETM2, autosomal dominant |
| Fragile X syndrome | Lack of FMR1 RNA binding protein, mental retardation | FMR1 gene is not expressed due to an CGG amplification in the 5'UTR region |
| Huntington's disease | Progressive dementia with onset in adulthood | HTT (huntington), autosomal dominant |
| Intestine | | |
| Bartter's syndrome (3 types) | Renal disease | Kidney chloride channel B gene (CLCNKB), autosomal recessive |
| Polycystic kidney disease (2 types) | renal disease | PDK1, PDK2, autosomal dominant, there is also an autosomal recessive form known (ARPKD) |
| Lung | | |
| Alpha-1-antitrypsin | Defect alveoli due to uncontrolled release of elastase | SERPINA1, autosomal codominant |
| Asthma | Chronic inflammatory disorder of the airways | Polygenic |
| Cystic fibrosis | Excessively viscous mucous due to defective Cl⁻ ion transport | CFTR (cystic fibrosis conductance transmembrane regulator), autosomal recessive |
| Surfactant metabolism dysfunction (various types) | Newborns are of normal body weight, but all fail to inflate | ATP-binding cassette transporter (ABCA3) |
| Primary cliliary dyskinesia | Excessively viscous mucous due to defective/missing cilia function | DNAI1, CCNO, CCDC40 among others |
| Lysosomal storage diseases | | |
| Fabry's disease | Beyond others, skin lesions due to the accumulation of ceramide trihexoside | α-Galactosidase A, X-chromosomal recessive |
| Gaucher's Disease Type-I: adult form (normal lifespan under treatment) Type-II: infantile form (death before age 1) Type-III: juvenile form (onset in early childhood, less severe than Type-II) | Accumulation of glucocerebrosides (gangliosides, sphingolipids) | Glucocerebrosidase, autosomal recessive, |
| Hunter's Syndrome | Accumulation of mucopolysaccharides | L-iduronosulfat sulfatase, X-chromosomal recessive |
| Hurler's Syndrome (death by age of 10) | Accumulation of mucopolysaccharides | α-L-iduronidase, autosomal recessive |
| Niemann-Pick Disease (three distinct forms A, B, C) | Defect in releasing Cholesterol from lysosomes, accumulation of Sphingomyelin | Sphingomyelinase, autosomal recessive |
| Tay-Sachs disease (death by age of 4) | Accumulation of $G_{M2}$ ganglioside in neuronal cells | Hexosaminidase A, autosomal recessive |

TABLE 2-continued

| Disease | Pathology | Gene, heredity |
| --- | --- | --- |
| Skin | | |
| Albinism | Nitrogen metabolism defect | Tyrosinase deficiency, autosomal recessive |
| Albinism, oculocutaneous, type II | Reduced biosynthesis of melanin pigment | OCA2, autosomal recessive |
| Ehlers-Danlos Syndrome (various types) | Diaphragmatic hernia. common, retinal detachment | Various defects in collagen synthesis |
| Epidermolysis bullosa (various types including EB simplex, Junctional EB, Dystrophic EB and Kindler syndrome) | Defects in maintenance of keratinocyte structural stability or adhesion of the keratinocyte to the underlying dermis | Epidermolysis bullosa macular type (EBM), Epidermolysis bullosa 3 progressiva (EBR3), Epidermolysis bullosa 4 pseudojunctual (EBR4), Desmoplakin (DSP), Plakophilin-1 (PKP1), kreatin (KRT5, KRT14), plectin (PLEC), ITGA6, integrin subunit (ITGB4), laminin subunits (LAMA3, LAMP3, LAMB3, LAMC2), collagen (COL17A1, COL7A1 (autosomal dominant), FERMT1, autosomal recessive |
| Hartnup's disease | Defect in tryptophan uptake in the gastrointestinal tract, light-sensitive skin | SLC6A19, autosomal recessive |
| Hereditary Hemorrhagic Telangiectasia, Osler-Weber-Rendu Syndrome | Telangiectasia of the skin and mucous membranes | Endoglin (ENG), autosomal dominant |
| Hypercholesterolemia, familial | elevation of serum cholesterol bound to low density lipoprotein, accumulation in skin and arteriosclerosis | Low-density lipoprotein receptor (LDLR), apolipoprotein B (APOB), autosomal dominant |
| *Xeroderma pigmentosa* | skin defect and melanoma due to UV exposure | DNA repair defect, autosomal recessive |
| Male pattern baldness | Disturbed conversion of testosterone into dihydrotestosterone in the skin | 5-α-reductase |
| Genetic liver diseases | | |
| Amino acid metabolism disorders | Disruptions in the multistep process that breaks down the amino acid tyrosine and phenylalanine | FAH, TAT, HPD, autosomal recessive |
| Beta-thalassemia intermedia | Shortage of mature red blood cells | HBB, autosomal recessive |
| Crigler-Najjar syndrome | Deficiency in glucuronidation in which bilirubin gets dissolvable in water | UGT1A1, autosomal recessive |
| Fatty acid oxidation disorders | Deficiency in processing long-chain fatty acids and very long-chain fatty acids resulting in lethargy and hypoglycemia | HADHA, ACADVL autosomal recessive |
| Fructose metabolism disorders | Impaired gluconeogenesis causing hypoglycemia | FBP1, ALDOB, autosomal recessive |
| Galactosemia | Deficiency in processing galactose | GALT, GALK1, GALE, autosomal recessive |
| Glycogen storage diseases | Disturbed breakdown of glucose 6-phosphate and glycogen leads to accumulation of glycogen as well as abnormal glycogen molecules causing cell damage | G6PC, SLC37A4, AGL, GBE1, autosomal recessive |

TABLE 2-continued

| Disease | Pathology | Gene, heredity |
|---|---|---|
| Heme biosynthesis disorder | Decrease of uroporphyrinogen decarboxylase resulting in accumulation of compounds called porphyrins causing toxic levels in liver | UROD autosomal dominant, ALAS2 X-linked dominant, ALAD autosomal recessive |
| Lipid metabolism (transport) disorders | Shortage of functional protein, which prevents movement of cholesterol and other lipids, leading to their accumulation in cells | NPC1, NPC2 autosomal recessive, LDLR, autosomal dominant |
| Metal metabolism disorders | Disorders in the storage and transport of iron and copper resulting in accumulation in tissues and organs | ATP7B, HAMP, HFE, HFE2, autosomal recessive |
| Organic acid disorders (Acidurias/ Acidemias) | Disrupted break down of several protein building blocks (amino acids), certain lipids, and cholesterol | BCKDHA, BCKDHB, and DBT, PCCA and PCCB, MUT, MMAA, MMAB, MMADHC, MCEE, IVD, MCCC1 or MCCC2, autosomal recessive |
| Primary hyperoxaluria type 1 | Disrupted breakdown of glyoxylate leading to renal damage | AGXT, GRHPR, autosomal recessive |
| Progressive familial intrahepatic cholestasis | Buildup of bile acids in liver cells causing liver damage | ATP8B1, autosomal recessive |
| Thrombocyte activity disorder | Lack of enzyme activity disrupts the usual balance between bleeding and clotting | ADAMTS13, autosomal recessive |
| Urea cycle disorders | Disorder of the urea cycle which causes a form of hyperammonemia | OTC (X-linked disorder), CPS1, ASS1 and SLC25A13, ASL, autosomal recessive |

As regards the step of purifying mRNA molecules the same applies as described above in connection with the method of purifying mRNA molecules according to the present invention, wherein said method comprises the steps of (Ia) purifying precipitated mRNA molecules from a suspension comprising precipitated mRNA molecules using a first solution, (Ib) washing and dissolving the purified precipitated mRNA molecules obtained from step (Ia) using a second solution, (IIa) purifying the mRNA molecules from the dissolved mRNA molecules obtained from step (Ib) using a third solution comprising a chelating agent such as EDTA, followed by (IIb) washing the purified mRNA molecules obtained from step (IIa) using a fourth solution, wherein steps (Ia) to (IIb) are performed using tangential flow filtration.

As regards the step of formulating the thus obtained purified mRNA molecules into a pharmaceutical composition, said step can comprise adding sodium chloride or citrate in case the mRNA molecules purified with water being used as the fourth solution used in step (IIb) and in the last step (IIb) in case of more than one step (IIb), respectively. This is advantageous in case the purified mRNA molecules are not obtained in a solution that comprises already sodium chloride or citrate or in case the purified mRNA molecules are obtained in a solution that contains already sodium chloride or citrate but at another concentration than desired for administration. In the latter case, the method might further comprise a step of determining the respective concentration and adjusting it if necessary. Preferably, the purified mRNA molecules are comprised in a solution that further comprises sodium chloride or citrate in an advantageous concentration for administration by using a fourth solution comprising said sodium chloride or citrate in the respective concentration with a pH between 3 and 6, preferably between 4 and 5, in (the last) step (IIb) of the method for purifying mRNA molecules described above.

Formulating the obtained purified mRNA molecules into a pharmaceutical composition can comprise the step of adding a pharmaceutically acceptable carrier. The purified mRNA molecules are preferably included in an effective amount, i.e. an amount sufficient to induce a detectable therapeutic response in the subject to which the pharmaceutical composition is to be administered. The purified mRNA molecules and/or the pharmaceutical composition may be in sterile aqueous or non-aqueous solutions, suspensions, and emulsions as well as creams and suppositories, but can also have the form of powders, tablets or aerosols.

The term "pharmaceutically acceptable carrier" used herein refers to chemical compounds, materials, ingredients, and/or compositions, which are, within the scope of sound medical judgment, suitable for use in contact with the tissues of human beings and animals without excessive toxicity, irritation, allergic response, or other problem or complication, commensurate with a reasonable benefit/risk ratio. Thus, a pharmaceutically acceptable carrier is an inactive substance formulated alongside the pharmaceutically active substance for facilitating its handling in view of dosage, adsorption, solubility or pharmacokinetic considerations.

Examples of suitable pharmaceutical acceptable carriers are well known in the art and include phosphate buffered saline solutions, buffer, water, emulsions, such as oil/water emulsions, various types of wetting agents, and sterile solutions. In particularly, aqueous carriers include water, alcoholic/aqueous solutions, emulsions or suspensions, including saline and buffered media. Examples of non-aqueous solvents are propylene glycol, polyethylene glycol, vegetable oils such as olive oil, and organic esters such as ethyl oleate. Further examples of pharmaceutically acceptable carriers include but are not limited to saline, Ringer's solution and dextrose solution, citrate, phosphate, and other organic acids; salt-forming counter-ions, e.g. sodium and potassium; low molecular weight (>10 amino acid residues) polypeptides; proteins, e.g. serum albumin, or gelatine; hydrophilic polymers, e.g. polyvinylpyrrolidone; amino acids such as histidine, glutamine, lysine, asparagine, arginine, or glycine; carbohydrates including glucose, mannose, or dextrins; monosaccharides; disaccharides; other sugars, e.g. sucrose, mannitol, trehalose or sorbitol; chelating agents, e.g. EDTA; non-ionic surfactants, e.g., polyoxyethylene sorbitan monolaurate, available on the market with the commercial name Tween, propylene glycol, Pluronics or polyethylene glycol; antioxidants including methionine, ascorbic acid and tocopherol; and/or preservatives, e.g. octadecyldimethylbenzyl ammonium chloride; hexamethonium chloride; benzalkonium chloride, benzethonium chloride; phenol, butyl or benzyl alcohol; alkyl parabens, e.g. methyl or propyl paraben; catechol; resorcinol; cyclohexanol; 3-pentanol; and m-cresol). Suitable pharmaceutically acceptable carriers and their formulations are described in greater detail in Remington's Pharmaceutical Sciences, 17th ed., 1985, Mack Publishing Co. Furthermore, preservatives, stabilizers and other additives may also be present such as, for example, antimicrobials, anti-oxidants, chelating agents, and inert gases, nanosystems or liposomes, and the like.

The present invention further relates to a pharmaceutical composition comprising mRNA molecules purified according to any of the respective methods disclosed herein and manufactured according to the method described above. The pharmaceutical composition is advantageous for adjusting and/or enhancing the translation of an amino acid sequence such as a protein in cells of a subject to which the pharmaceutical composition is administered, wherein the presence of said amino acid sequence such as a protein is beneficial and/or needed for the subject for example in the context of a disease.

As regards the pharmaceutical composition, the mRNA molecules, their purification and the formulation of the pharmaceutical composition the same applies as stated above including features and advantages mentioned in the context of the respective embodiments described above.

The pharmaceutical composition of the present invention may be administered via a large range of classes of forms and routes of administration known to the skilled person, such as needle injection, the use of inhalators, nebulizers, creams, foams, gels, lotions and ointments. Dose and duration of action depend on the function which said purified mRNA molecules are to fulfil and have to be deliberately adjusted in each case. The duration of action will be as long as possible for example, if said purified mRNA molecules are used for a chronic therapy of a disease due to a deficient gene, while with other indications it can be adjusted to a specific time window. Furthermore, systemic administration of said purified mRNA molecules formulated into a suitable pharmaceutical composition is possible.

FIG. 1: Overview of a continuous tangential flow filtration (TFF) system with circulating mRNA molecules according to the disclosed method. The mRNA molecules are in suspension in step (Ia), dissolved in step (Ib), and in solution in case of steps (IIa) and (IIb), respectively.

FIG. 2: Overview of an exemplary system for purifying mRNA molecules according to the disclosed method (with exemplarily depicted positions of valves, (auxiliary) pumps, and/or (further) vessels).

Figure 3:
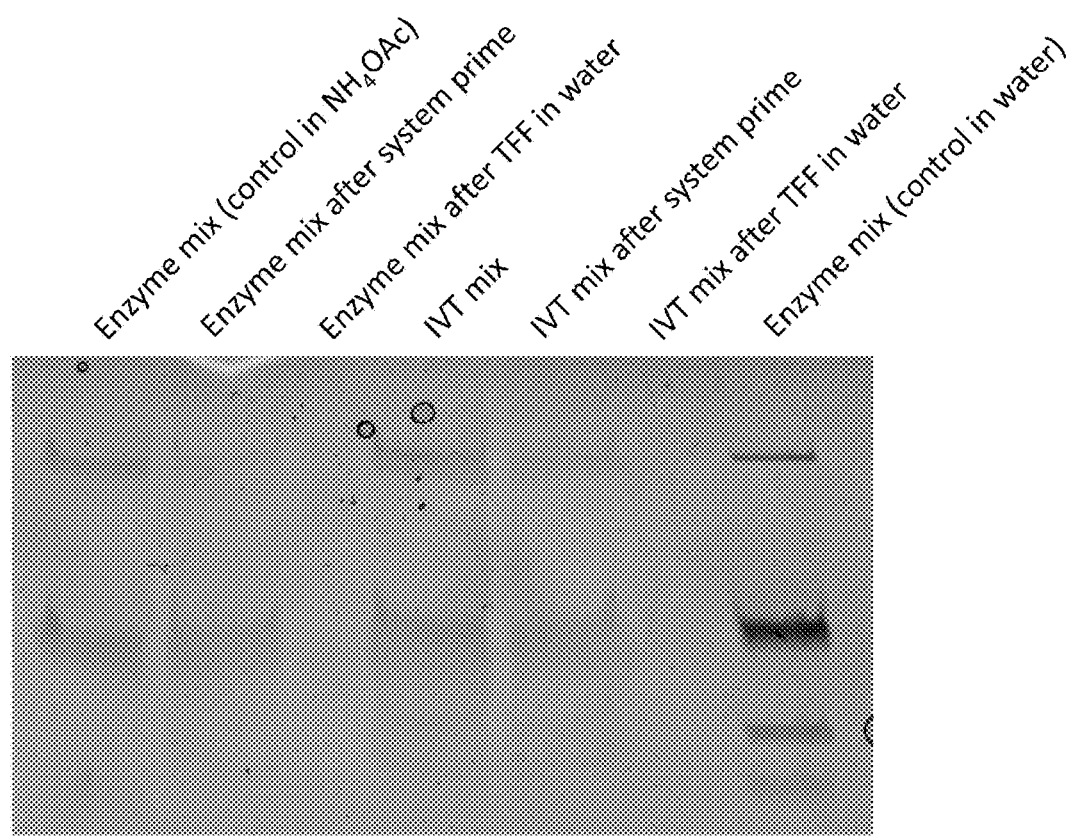

FIG. 3: SDS-PAGE followed by colloidal coomassie staining of the TFF retentate comprising unmodified tdTomato encoding mRNA molecules after purification of the respective in vitro transcription (IVT) mix according to steps (Ia) and (Ib) at RT. Lane 1: enzyme mix in ammoniumacetate ($NH_4OAc$) as control; lane 2: enzyme mix after priming the TFF system; lane 3: enzyme mix after TFF in nuclease free water; lane 4: IVT mix; lane 5: IVT mix after priming the TFF system; lane 6: IVT mix after TFF in nuclease free water; lane 7: enzyme mix in nuclease free water as control. The enzyme mix consisted of RNase inhibitor, T7 RNA polymerase, inorganic pyrophosphatase, and DNase I.

Figure 4:
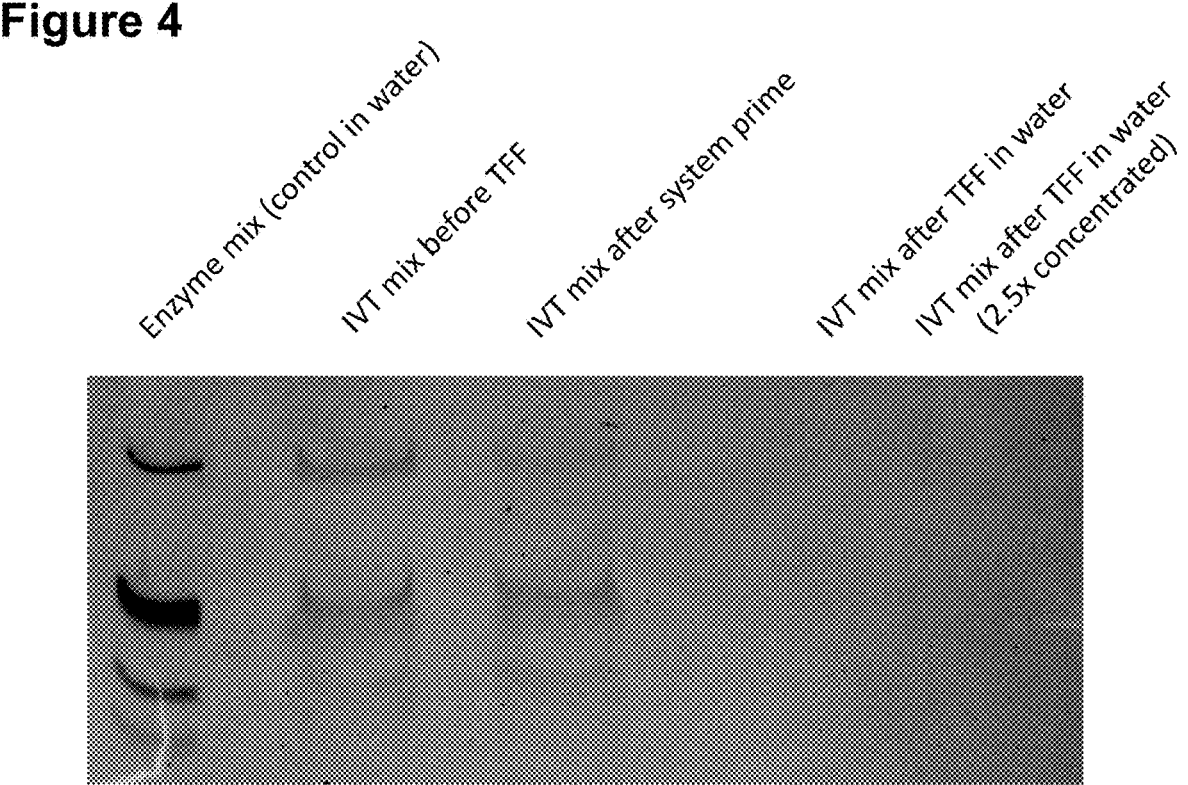

FIG. 4: SDS-PAGE followed by colloidal coomassie staining of the TFF retentate comprising unmodified tdTomato encoding mRNA molecules after purification of the respective in vitro transcription (IVT) mix according to steps (Ia) and (b) at RT. Lane 1: enzyme mix in nuclease free water as control; lane 2: IVT mix before TFF; lane 3: IVT mix after priming the TFF system; lane 4: IVT mix after TFF in nuclease free water; lane 5: IVT mix after TFF in nuclease free water (after diafiltration with 2.5 M ammoniumacetate and nuclease free water, the respective mix was concentrated 2.5 fold to efficiently detect protein removal). The enzyme mix consisted of RNase inhibitor, T7 RNA polymerase, inorganic pyrophosphatase, and DNase I.

Figure 5:
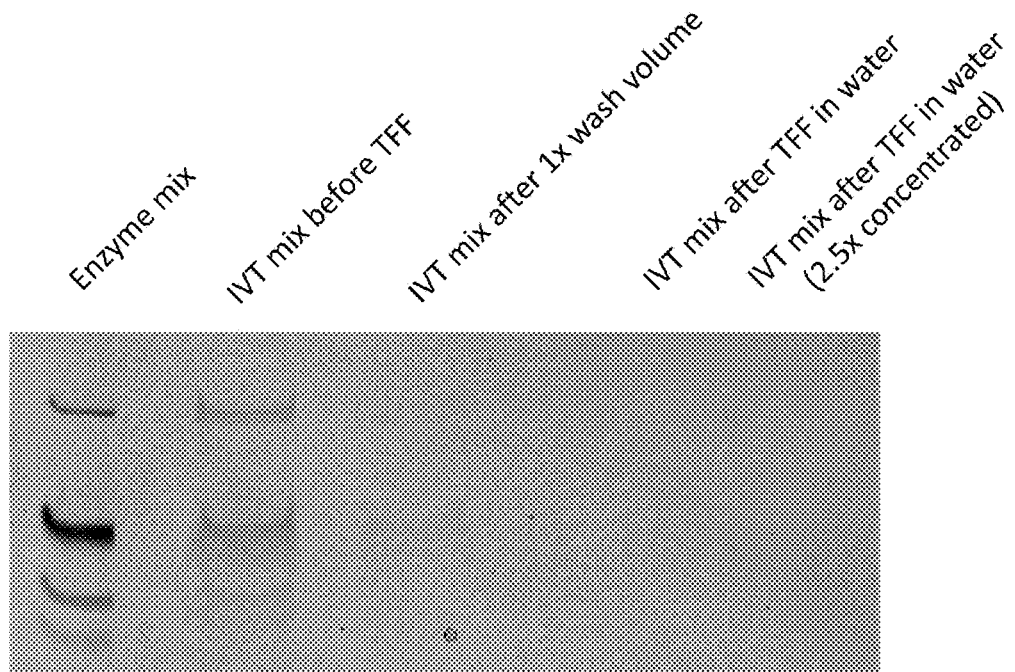

FIG. 5: SDS-PAGE followed by colloidal coomassie staining of the TFF retentate comprising unmodified tdTomato encoding mRNA molecules after purification of the respective in vitro transcription (IVT) mix according to steps (Ia) and (b) at 4° C. Lane 1: enzyme mix in nuclease free water as control; lane 2: IVT mix before TFF; lane 3: IVT mix after one wash volume (equal to initial feed volume); lane 4: IVT mix after TFF in nuclease free water; lane 5: IVT mix after TFF in nuclease free water (after diafiltration with 2.5 M ammoniumacetate and nuclease free water, the respective mix was concentrated 2.5 fold to efficiently detect protein removal). The enzyme mix consisted of RNase inhibitor, T7 RNA polymerase, inorganic pyrophosphatase, and DNase I.

FIG. 6: A) Western Blot of hCFTR protein translated in HEK293 cells after transfection with TFF purified hCFTR mRNA and hCFTR mRNA purified by ammoniumacetate precipitation followed by ethanol 70% wash, formulated using Lipofectamine Messenger Max. As house keeper, Hsp90 protein bands are shown. Untransfected cells were used as negative control. B) Expressed hCFTR was quantified by densitometric analysis using Image Lab Software and normalized to HSP90 protein. Untransfected cells (UT) were used as negative control.

FIG. 7: Residual amounts of different spiked in mRNA molecules not being hCFTR compared to the amount of the hCFTR target mRNA molecules after varying wash volumes in percentage. Tangential flow filtration was performed at RT.

FIG. 8: Residual amounts of different spiked in mRNA molecules not being hCFTR compared to the amount of the hCFTR target mRNA molecules after varying wash volumes in percentage. Tangential flow filtration was performed at 4° C.

Figure 9:
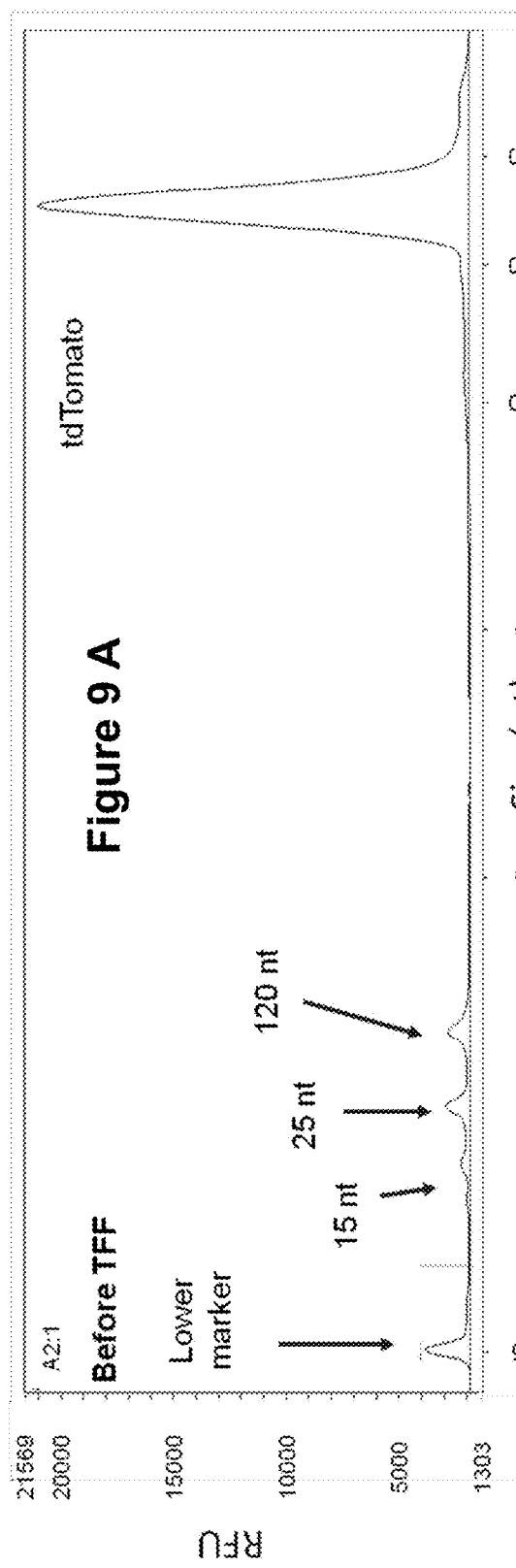
Figure 9:
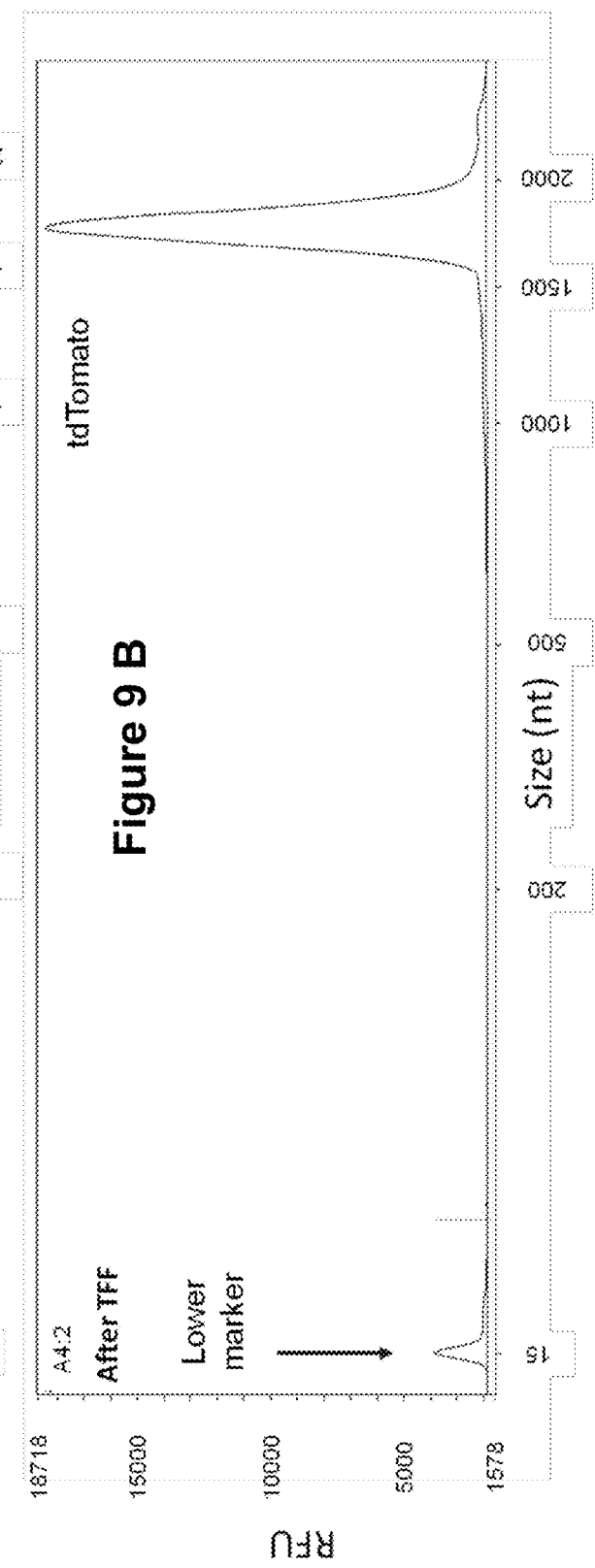

FIG. 9: Capillary gel electrophoresis using Fragment Analyzer was performed from tdTomato mRNA spiked with different DNA oligonucleotides (15 nt, 25 nt and 120 nt) containing a 25 nt antisense DNA oligonucleotide before (A) and after (B) TFF purification at 4° C. The lower marker is an internal standard provided in the reagent kit of the Fragment Analyzer to normalize the retention times of the peak in each capillary run (15 nt long RNA oligonucleotide).

Figure 10:
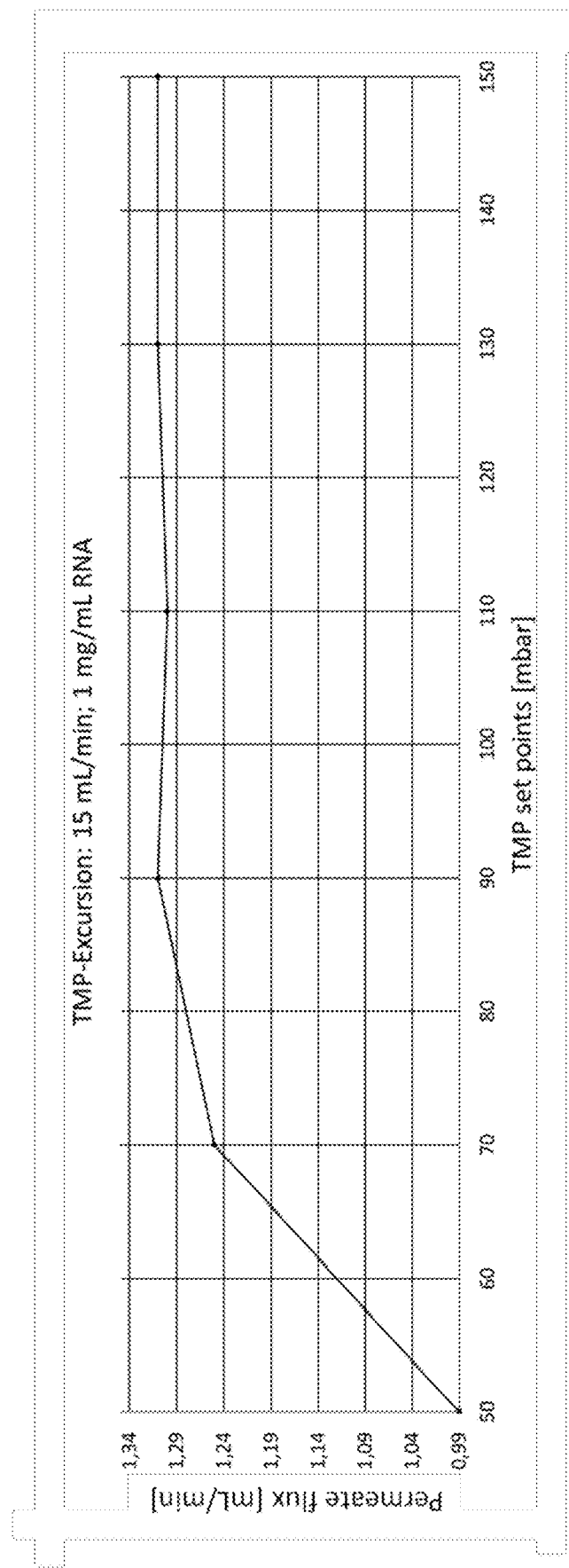

FIG. 10: Representatively, permeate flux was measured at different transmembrane pressure set points.

FIG. 11: Capillary gel electrophoresis using Fragment Analyzer was performed from hCFTR mRNA spiked with 25 nt and 120 nt long DNA oligonucleotides and 256 nt long GLP-1 mRNA molecules before purification according to Approach 1 (A), after step (Ib) (B), after step (IIa) (C), and after step (IIb) (D) at RT. The lower marker is an internal standard provided in the reagent kit of the Fragment Analyzer to normalize the retention times of the peak in each capillary run (15 nt long RNA oligonucleotide).

FIG. 12: Capillary gel electrophoresis using Fragment Analyzer was performed from hCFTR mRNA spiked with 25 nt and 120 nt long DNA oligonucleotides and 256 nt long GLP-1 mRNA molecules before (A) and after (B) purification according to Approach 2 at RT. The lower marker is an internal standard provided in the reagent kit of the Fragment Analyzer to normalize the retention times of the peak in each capillary run (15 nt long RNA oligonucleotide).

Other aspects and advantages of the invention will be described in the following examples, which are given for purposes of illustration and not by way of limitation. Each publication, patent, patent application or other document cited in this application is hereby incorporated by reference in its entirety.

EXAMPLES

Methods and materials are described herein for use in the present disclosure; other, suitable methods and materials known in the art can also be used. The materials, methods, and examples are illustrative only and not intended to be limiting.

Abbreviations used herein and their respective descriptions are listed in Table 3.

TABLE 3

| Abbreviation | Description |
| --- | --- |
| ° C. | Celsius Degree |
| CFTR | Cystic Fibrosis Transmembrane Conductance Regulator |
| EDTA | Ethylenediaminetetraacetic acid |
| HPLC | High performance liquid chromatography |
| IVT | In vitro transcription |
| kDa | Kilodalton |
| l // ml | Litre // Millilitre |
| M // mM | Molar // Millimolar |
| mbar | Millibar |
| min | Minute |
| mg | Milligram |
| MOPS | 3-(N-morpholino)propanesulfonic acid |
| mPES | Modified Polyethersulfone |
| mRNA | Messenger ribonucleic acid (RNA) |
| MWCO | Molecular weight cut-off |
| NaOH | Sodium hydroxide |
| nt | Nucleotide(s) |
| $NH_4OAc$ | Ammonium acetate, $CH_3COONH_4$ |
| RT | Room temperature, e.g. between 20° C. to 25° C., e.g. 22° C. |
| SDS-PAGE | Sodium dodecyl sulfate polyacrylamide gel electrophoresis |

TABLE 3-continued

| Abbreviation | Description |
| --- | --- |
| TFF | Tangential flow filtration |
| TMP | Transmembrane pressure |
| x | Fold |
| μl | Micro litre |
| % | Percentage |

Material and Methods

Materials, Devices, Software, and Test System Used

Materials are listed in Table 4.

TABLE 4

| Material | Supplier | Cat# |
| --- | --- | --- |
| 5M Ammoniumacetate solution pH 7 | Sigma Aldrich | 09691-1L |
| 50 kDa mPES TFF filter | Spectrumlabs | C02-E050-05-N |
| 100 kDA mPES TFF filter | Spectrumlabs | C02-E100-05-N |
| 300 kDa mPES TFF filter | Spectrumlabs | C02-E300-05-N |
| 500 kDA mPES TFF flter | Spectrumlabs | C02-E500-05-N |
| HiPerSolv Chromanorm Water for HPLC | VWR | 83650.320 |
| Aqua ad iniectabilia | B. Braun | 3703444 |
| EDTA disodium salt solution pH 7 | Sigma Aldrich | E7889 |
| MOPS BioUltra for molecular biology | Sigma Aldrich | 6947 |
| Sodiumhydroxide 32% solution | Carl Roth | T197.1 |
| Standard Sensitivity RNA Analysis Kit (15 nt) | Advanced Analytical | DNF-471 |
| Lipofectamine® MessengerMax™ | Thermo Fisher Scientific | LMRNA015 |
| Luminata Classico | Millipore | WBLUC0500 |
| MEM, GlutaMAX™ Supplement | Thermo Fisher Scientific | 41090028 |
| Precision Plus Protein Dual Color Standard | Bio-Rad | 161-0374 |
| PVDF Pre-cut Blotting Membranes, 0.2 μm | Thermo Fisher Scientific | LC2002 |
| Roti-Load | Carl Roth | K930.1 |
| SuperSignal™ West Femto | Thermo Fisher Scientific | 34095 |
| TRIS-Acetate 3-8%, 1 mm, 15-well | Thermo Fisher Scientific | EA03755BOX |
| TRIS-Acetate Running Buffer | Thermo Fisher Scientific | LA0041 |
| TRYPSIN 0.05% EDTA | Thermo Fisher Scientific | 25300054 |
| WesternBreeze® Blocker/Diluent | Thermo Fisher Scientific | WB7050 |
| WesternBreeze® Wash Solution (16X) | Thermo Fisher Scientific | WB7003 |
| mouse anti-humanCFTR mAb | R&D Systems | MAB25031 |
| mouse anti-HSP90 mAb | Origene | TA500494 |
| cOmpleete™, EDTA-free Protease Inhibitor | Sigma-Aldrich | 11873580001 |
| Dithiotreitol (DTT) | GE Healthcare | 17-1318-02 |
| DNase I Solution (2500 U/mL) | Thermo Fisher Scientific | 90083 |
| DPBS 1x without Ca and Mg | Thermo Fisher Scientific | 14190-169 |
| Fetal Bovine Serum, heatinactivated | Thermo Fisher Scientific | 10500064 |
| donkey anti-mouse IgG-HRP | Abcam | ab6820 |
| Colloidal Coomassie | Roth | A152.1 |
| o-Phosphoric acid, 85% Rotipuran, p.a., ACS, ISO | Carl Roth | 63661. |
| RiboLick Rnase Inhibitor | Thermo Fisher Scientific | |
| DNAse I (Rnase-free) | Thermo Fisher Scientific | |
| Inorganic Pyrophosphatase | Thermo Fisher Scientific | |
| T7 RNA Polymerase | Thermo Fisher Scientific | |

TABLE 4-continued

| Material | Supplier | Cat# |
|---|---|---|
| Bolt 4 - 12% Bis-Tris Plus 10 wells | Invitrogen | NW04120BOX |
| Bolt LDS sample loading buffer (4x) | Life technologies | B0007 |
| Precision Plus Protein Dual Color Standards | BioRad | 161-0374 |
| Bolt MES SDS running buffer 20x | Life technologies | B0002 |
| Magnesiumchlorde solution | Sigma Aldrich | M1028 |
| Spermidine | Sigma Aldrich | 85578 |
| Dithiotreithol (DTT) solution | Sigma Aldrich | 43816 |
| GTP | Jena Bioscience | NU-1012 |
| ATP | Jena Bioscience | NU-1010 |
| CTP | Jena Bioscience | NU-1011 |
| UTP | Jena Bioscience | NU-1013 |
| ARCA cap analogue | Jena Bioscience | NU-855 |

Devices are listed in Table 5.

TABLE 5

| Device | Supplier |
|---|---|
| KR2i TFF System | Spectrum Laboratories, Inc. |
| Fragment Analyzer | Advanced Analytical |
| Chemidoc XRS | BioRad Laboratories |
| Novex Bolt Mini Gel Tank | Life technologies |

Software is listed in Table 6.

TABLE 6

| Software | Provider |
|---|---|
| ProSize 3.0 | Advanced Analytical |
| Excel Plug In | Spectrum Laboratories, Inc. |
| MS Excel | Microsoft |
| Image Lab | BioRad Laboratories |
| Open Lab Chem Station | Agilent |

The test system is listed in Table 7.

TABLE 7

| Test System | Species | Strain |
|---|---|---|
| HEK 293 | human | N.A. |

Purification of an IVT Mix Via TFF—Steps (Ia) and (Ib)

In the following, an in vitro transcription (IVT) mix was used comprising unmodified, in vitro transcribed unmodified tdTomato target mRNA molecules with 1644 nucleotides (nt) in length. Furthermore, an enzyme mix was used comprising T7 RNA Polymerase, inorganic pyrophosphatase, RNAse inhibitor, and DNase I.

RNA Precipitation

The IVT mix and the enzyme mix were each precipitated with an equal amount of ice cold 5 M $NH_4OAc$ with a pH of 7 to a final concentration of 2.5 M $NH_4OAc$ and incubated on ice for at least 30 minutes. Prior to TFF, the respective mix was diluted 1:1 with 2.5 M $NH_4OAc$ pH 7 to a final concentration of about 0.5 mg/ml mRNA in the mix. The IVT or enzyme mix was connected to the TFF system, which was initially primed for 10 minutes by circulating the IVT mix at 50 ml/min with the permeate clamp closed.

Step (Ia): Removal of Proteins, Nucleotides, and Salts

Diafiltration of the respective mix was performed at 50 ml/min at a constant TMP of about 200-300 mbar using a 500 kDa MWCO mPES filter column. The respective mix was diafiltered with 10 wash volumes of 2.5 M $NH_4OAc$ pH 7. This step efficiently removed enzymes, nucleotides as well as buffer components from the in vitro transcription. Step (Ia) can be used to remove any other proteins and/or enzymes from any other intermediate production steps (e.g. dephosphorylation, post capping, polyadenylation, . . . ). For some enzymes (e.g. poly(A) polymerase, which binds with high affinity to mRNA molecules of interest) a detergent (e.g. SDS, LDS, . . . ) may be added to the ammoniumacetate buffer pH 7. In case poly(A) polymerase is used for polyadenylation, the subsequent step (Ia) is preferably performed at a temperature between 20° C. and 30° C., preferably between 23° C. and 27° C., more preferably at 25° C. Such a temperature is advantageous for efficient poly(A) polymerase removal.

Step (Ib): Removal of $NH_4OAc$ from Step (Ia)

In order remove $NH_4OAc$ and resolve the mRNA molecules, a 100 kDA MWCO mPES filter column was used for diafiltration with 10 wash volumes using nuclease free water at a flow rate of 50 ml/min and a TMP of about 200-300 mbar. Alternatively, a 50 kDa MWCO mPES filter column may be used depending on the size of the mRNA molecule.

For investigating the purification efficiency of steps (Ia) and (Ib), the TFF retentate comprising the mRNA molecules can be sampled before and after TFF (i.e. step (Ib)) and analyzed for example using UV-measurement, fragment analyzer, sodium dodecyl sulfate polyacrylamide gel electrophoresis (SDS-PAGE) followed by e.g. colloidal coomassie staining.

As shown in FIGS. 3 to 5, enzymes can be efficiently removed from mRNA molecules by applying steps (Ia) and (Ib) as described above. Thereby mRNA molecules were retained by the TFF column, whereas the enzymes and/or proteins were efficiently removed. Smear peak analysis revealed that the smear pre-peak was 4.7% before TFF purification, and had a deviation of +1.3% for TFF purification at 4° C. and +1.8% after TFF purification performed at RT. Therefore no degradation of mRNA could be observed.

Purification of Precipitated and Dissolved mRNA Via TFF—Development of Steps (IIa) and (IIb)

In the following, the precipitated and dissolved mRNA was used for further purification.

Testing Different Filtration Membranes and the Effect of EDTA on mRNA Transmission Different filter membranes having varying pore sizes were tested with regard to the transmission of mRNA molecules using either nuclease free water alone or nuclease free water with additional 10 mM ethylenediaminetetraacetic acid (EDTA). Four mPES columns were tested having a molecular weight cut-off (MWCO) of 500 kDa, 300 kDa, 100 kDa and 50 kDa, respectively. The transmembrane pressure (TMP) was adjusted using the retentate clamp on the TFF system and kept at 40 mbar for the columns with a MWCO of 500 kDa and 50 kDa, respectively, and at 100 mbar for the columns with a MWCO of 100 kDa and 300 kDa, respectively. The main pump was set to a flow rate of 15 ml/min and the TFF was performed at RT. The initial mRNA molecule concentration in the feed was 0.1 mg/ml and the mRNA molecule concentrations in retentate and permeate were measured using UV-measurements. Each column was tested with 10× wash volumes of the original sample volume. Without EDTA, mRNA molecules were retained by the tested column having a MWCO of 500 kDa. It was assumed that smaller pore sizes (i.e. 300 kDa, 100 kDa and 50 kDa) will not allow passage of the mRNA molecules either and were therefore not further tested without EDTA present.

With EDTA, the mRNA molecules surprisingly moved through the pores of the 500 kDa MWCO filter membrane and were also partly lost using the 300 kDa MWCO filter membrane. However, the mRNA molecules could be successfully retained using the 100 and the 50 kDa MWCO filter membranes in the presence of 10 mM EDTA. Hence, the 100 kDa MWCO column was chosen for the filtration of mRNA molecules in the experiments shown below.

It has to be noted that sporadic precipitation of the mRNA molecules was observed in some cases after filtration with 10 mM EDTA. However, this precipitation could be efficiently prevented by using a buffer comprising 40 mM MOPS and 10 mM EDTA.

Preparation of a 40 mM MOPS and 10 mM EDTA Diafiltration Buffer

An 1 M 3-(N-morpholino)propanesulfonic acid (MOPS) buffer was prepared, wherein the MOPS was dissolved in nuclease free water. The pH of the 1 M MOPS buffer was then adjusted to a pH of 7 using 32% NaOH. The obtained 1 M MOPS buffer having a pH of 7 was mixed with 0.5 M EDTA and nuclease free water to finally obtain a diafiltration buffer comprising 40 mM MOPS and 10 mM EDTA.

Determination of Wash Buffer Volumes to Remove Nucleic Acid Oligonucleotides

The efficiency of the TFF process, i.e. the minimal number of wash cycles needed for complete removal of impurities such as nucleic acid oligonucleotides representing abortive transcripts and/or hydrolysis products, strongly depends on the rejection of the molecule by the membrane filter and its pore size. Hence, the respective effect of wash buffer volumes was investigated to determine the number of wash cycles required to remove spiked nucleic acid oligonucleotides from precipitated and dissolved mRNA comprising mRNA molecules of interest.

For this experiment, the TFF flow rate was set to 15 ml/min and the TMP was kept constant at about 40 mbar using a 100 kDa MWCO mPES filter column. In a total feed volume of 5 ml, 500 μL of mRNA molecules were spiked with 10 nt long DNA oligonucleotide representing 2.5% of the target mRNA molecule (m/m), 50 nt long DNA oligonucleotide representing 2.5% of the target mRNA molecule (m/m), and 120 nt long DNA oligonucleotides representing 5% of the target mRNA molecule (m/m). Samples for reversed-phase HPLC analysis were drawn after 5×, 10×, 15×, and 20× wash volumes of the original feed volume with the diafiltration buffer comprising 40 mM MOPS and 10 mM EDTA. Before sample drawing the permeate clamp was closed and the retentate valve opened for circulation of the retentate at 50 ml/min for 5 minutes. For each wash cycle 100 μL sample were drawn using a sterile syringe and the samples were kept on ice until analysis. TFF was performed at room temperature. Samples were investigated using reversed-phase HPLC analysis with the area detected at 260 nm being representative for the relative amounts of DNA oligonucleotide in the sample. The corresponding areas before TFF (control) were set to 100% oligonucleotide.

In all cases, no nucleic acid oligonucleotides could be detected after applying 5×, 10×, 15×, and 20× wash volumes to the feed volume, respectively. Hence, results showed that already after 5× wash volumes with washing buffer no more nucleic acid oligonucleotides could be detected in the retentate. A minimum of 10× wash volume with washing buffer was determined to be sufficient for the removal of the nucleic acid oligonucleotides from mRNA molecules.

Determination of Wash Volumes with Nuclease Free Water for Removal of EDTA

Since removal of the DNA oligonucleotides by TFF is performed using washing buffer, i.e. diafiltration buffer comprising 40 mM MOPS and 10 mM EDTA, a subsequent filtration step is advantageous for exchanging the washing buffer with nuclease free water. Hence, an experiment was performed to determine the amount of wash cycles required for the removal of the washing buffer from the mRNA molecules. From the previous experiment the feed solution comprising the mRNA molecules and having a total volume of about 5 ml that has previously been filtered with 20× wash volumes of diafiltration buffer was diafiltered with nuclease free water at a flow rate of 15 ml/min and a constant TMP of 40 mbar using a 100 kDA MWCO mPES filter column. Samples for the reversed-phase HPLC analysis were taken after 5×, 10×, 15× and 20× wash volumes of the original feed volume with nuclease free water. In order to quantify the amount of residual EDTA after each washing cycle with nuclease free water the diafiltration buffer comprising 40 mM MOPS and 10 mM EDTA was titrated and a calibration standard curve recorded (cf. Table 6; MOPS-EDTA calibration standard curve: $\log(y)=0.6467 \log(x)+1.9128$; $r=0.99462$; $r^2=0.99877$; curve model: log/log). Since MOPS buffer alone shows no absorption signal at 260 nm, the concentrations stated in Table 8 and Table 9 correspond to the concentration of EDTA. The experiment was performed at 22° C. RT. In Table 9 data are shown after EDTA removal after each wash cycle.

As shown in Table 9, the decreasing amounts of EDTA according to the peak area detected by reversed-phase HPLC at 260 nm after increasing wash volumes revealed that a minimum of 10× wash volumes with nuclease free water were necessary for partly removal of residual EDTA.

TABLE 8

| EDTA cSOLL [mM] | Peak Area 260 nm | EDTA calculated [mM] | Accuracy | Absolute accuracy |
|---|---|---|---|---|
| 1.00 | 74.864 | 0.92 | 92% | 8% |
| 0.80 | 68.269 | 0.79 | 99% | 1% |
| 0.50 | 56.447 | 0.57 | 115% | 15% |
| 0.10 | 19.282 | 0.10 | 96% | 4% |
| 0.05 | 13.057 | 0.05 | 100% | 0% |

TABLE 9

| ID | AREA MOPS-EDTA | Residual EDTA [mM] |
|---|---|---|
| 20x washing buffer 0x nuclease free water | 205.65 | Above ULOQ |
| 20x washing buffer 5x nuclease free water | 60.7 | 0.65 |
| 20x washing buffer 10x nuclease free water | 24.3 | 0.14 |
| 20x washing buffer 15x nucleasre free water | 7.8 | Below LOQ |
| 20x washing buffer 20x nuclease free water | 13.8 | 0.05 |

Testing of the Determined Parameters

In the previous experiments that were carried out at RT, the minimum number of wash cycles using diafiltration buffer required for removing DNA oligonucleotides in step (IIa) as well as the minimum number of wash cycles using nuclease free water required for removing residual EDTA in step (IIb) were determined. For testing the determined parameters, 500 μg of mRNA were spiked with 10 nt long nucleic acid oligonucleotides representing 2.5% of the target mRNA molecule volume, 50 nt long DNA oligonucleotide representing 2.5% of the target mRNA molecule volume, and 120 nt long DNA oligonucleotide representing 5% of the target mRNA molecule volume in a total feed volume of 5 ml (referred to as "Before TFF" in Table 8 and Table 9).

For experiments described below the following set up was used if not stated otherwise: The feed solution comprising 0.1 mg/ml mRNA molecules was diafiltered using a 100 kDa MWCO mPES filter column at a flow rate of 15 ml/min and a TMP of about 40 mbar. The applied wash volumes were in both cases 10×, i.e. 10× wash volume with diafiltration buffer comprising 40 mM MOPS and 10 mM EDTA followed by 10× wash volume with nuclease free water (referred to as 'After TFF' in Table 8 and Table 9). Since mRNA molecules are prone to degradation by hydrolysis especially at elevated temperatures, the experiments were carried out at 4° C., i.e. using ice water, to keep mRNA molecule hydrolysis at a minimum.

This set up resulted in the efficient removal of DNA oligonucleotides of all three lengths tested (Table 10) as well as of residual diafiltration buffer (Table 11) as determines using reversed-phase HPLC. Furthermore, smear peak analysis were performed after capillary gel electrophoresis using Fragment Analyzer before and after purification (Table 12). Smear peak analyses indicated that the mRNA integrity did not vary due to the TFF purification and thus, was not affected by the method.

TABLE 10

| | Peak area of DNA oligonucleotides | | |
|---|---|---|---|
| | Length 10 nt | Length 50 nt | Length 120 nt |
| Before TFF | 100% | 100% | 100% |
| After TFF | 0.0% | 0.0% | 0.0% |

TABLE 11

| | Peak area MOPS-EDTA | Residual MOPS-EDTA [mM] |
|---|---|---|
| Before TFF | 193.0 | Above upper limit of quantification |
| After TFF | 27.4 | 0.17 |

TABLE 12

| | Smear pre-peak [%] |
|---|---|
| Reference (without MOPS-EDTA) | 20.0 |
| Before TFF with MOPS-EDTA, pH 7; Duplicate 1 | 18.2 |
| Before TFF with MOPS-EDTA, pH 7; Duplicate 2 | 15.4 |
| 10× wash buffer 10× nuclease free water; Duplicate 1 | 17.4 |
| 10× wash buffer 10× nuclease free water; Duplicate 2 | 16.5 |

Determination of the Translation Efficiency of Purified mRNA Molecules

Furthermore, it was of great interest to determine the translation efficiency of the obtained purified mRNA molecules. Hence, $1.4 \times 10^6$ HEK293 cells were seeded in 6-well plates and transfected with 3.75 µg mRNA molecules purified as described above and according to a standard procedure, respectively. Transfection was performed using MessengerMax (1:15). After 24 h, the cells were lysed and investigated using SDS-page and Western Blot, respectively, using 50 µg cell lysate each.

As it can be seen in FIG. 6, a comparable amount of mRNA molecules was detected using Western Blot (A) and quantified (B).

Determination of a Threshold for the Removal of mRNA with Different Lengths

A total of 300 µg of mRNA target hCFTR mRNA was spiked with different mRNA molecules varying in length using a total volume of 5 ml. In particular, 6 different types of mRNA molecules were used for spiking with each type representing 16.7% of the target mRNA molecule volume. Three types of mRNA molecules exhibited a cap and a poly(A) tail and had a total length of 3,632 nt, 1,864 nt, and 1,111 nt, respectively. Two types had neither a cap nor a poly(A) tail and exhibited a total length of 494 nt and 256 nt, respectively. The last type referred to a 120 nt DNA long oligonucleotide that served as a positive control.

The spiked mRNA molecule comprising solution was filtered as described above at RT (FIG. 7) and 4° C. (FIG. 8), respectively. Samples were drawn before TFF (directly after sample preparation), after 5×, 10×, 15× and 20× wash volumes of the original sample volume using the diafiltration buffer described above, and after additional washing using 10× wash volumes of nuclease free water. For each wash cycle, 100 µl sample was drawn using a sterile syringe and kept on ice until analysis. Transmission of the molecules through the filter pores was assessed via capillary gel electrophoresis using a Fragment Analyzer.

As shown in FIG. 7 and FIG. 8, a cut-off for mRNA molecules having at least a length of 951 nt could be observed using a 100 kDa mPES column. For mRNA molecules having a length of less than 951 nt, columns having a lower MWCO might be advantageous such as for example 50 kDa or 70 kDa mPES columns.

Increasing the mRNA Molecule Concentration from 0.1 mg/ml to 1 mg/ml

In the following final set of experiments (FIG. 9), the filtering procedure described in the following was applied to a solution comprising unmodified, 1644 nt long unmodified tdTomato mRNA as target mRNA molecule. In particular, a total of 5 ml feed solution was analyzed comprising 1 mg/ml mRNA molecules, corresponding to a total of 5 mg of mRNA molecules, as well as a 15 nt DNA oligonucleotide and an antisense 25 nt long oligonucleotide—which complementary binds to the mRNA molecule of interest—representing 2.5% of the target mRNA molecule (m/m), and 120 nt long oligonucleotides representing 5% of the target mRNA molecule (m/m). This spiked feed solution was diafiltered at 4° C. using a 100 kDa MWCO mPES filter column at a flow rate of 15 ml/min and a TMP of about 40 mbar. The applied wash volumes were i) 10× wash volume with nuclease free water, followed by ii) 10× wash volume with diafiltration buffer comprising 40 mM MOPS and 10 mM EDTA, followed by iii) 10× wash volume with nuclease free water.

Smear values were investigated as an indicator for mRNA integrity. In particular, the following smear values were obtained: a smear pre-peak of 6.4% before TFF as well as a smear pre-peak of 5.9% after TFF. The smear pre-peak areas reflect the proportion of mRNA related hydrolysed products. Thus, no hydrolysis products could be measured by Fragment Analyzer analysis and it could be shown that TFF purification does not affect mRNA integrity.

Exemplary Outline for the Determination of Optimal TFF Parameters Applying Routine Measures The following is a brief description how the skilled person can optimize the TFF method described above by applying routine measures.

Step (Ia)

The TFF flow rate can be adjusted so as to achieve a sufficient shear rate in order to re-circulate the precipitated mRNA molecules through the TFF system and to sweep away the precipitated mRNA molecules from the filter surface. By opening the permeate clamp a sufficient permeate flux can be achieved. Enzyme removal can be determined e.g. by SDS-Page analysis and required wash volumes can be adjusted by routine measures (preferably 1-20 wash volumes; more preferably 5-15; most preferably 9-11). One wash volume is defined as an equal volume of diafiltration medium, e.g. ammonium acetate buffer with a pH of 7, of the initial feed volume.

Step (Ib)

Same parameters as described in step (Ia) can be applied. Hereby buffer can, e.g., be exchanged by nuclease free water in order to resolve mRNA molecules and to remove buffer (e.g. ammonium acetate). Buffer removal can be determined by e.g. conductivity, UV-measurement and required wash volumes can be adjusted by routine measures (preferably 1-20 wash volumes; more preferably 5-15; most preferably 9-11). One wash volume is defined as an equal volume of diafiltration medium, e.g. nuclease free water, of the initial feed volume.

Step (IIa)

The TFF flow rate can be adjusted so as to achieve a sufficient shear rate in order to re-circulate the mRNA molecules through the TFF system and to sweep away the mRNA molecules from the filter surface. By opening the permeate clamp a sufficient permeate flux can be achieved. Loss of mRNA of interest can be monitored e.g. by UV-measurement (e.g. online/offline measurement) in the permeate line. If loss of mRNA of interest is observed flow rate and/or TMP can be adjusted by routine measures until no further loss of mRNA of interest is observed. Required wash volumes can be adjusted by routine measures dependent from the amount of impurities (e.g. abortive transcripts, and/or hydrolysis products); (preferably 1-20 wash volumes; more preferably 5-15; most preferably 9-11). One wash volume is defined as an equal volume of diafiltration medium, e.g. MOPS-EDTA at a pH of 7, of the initial feed volume.

Step (IIb)

Same parameters as described in step (IIa) can be applied. Hereby buffer can, e.g., be exchanged by nuclease free water in order to remove buffer, e.g. MOPS-EDTA. Buffer removal can be determined by e.g. conductivity, UV-measurement and required wash volumes can be adjusted by routine measures (preferably 1-20 wash volumes; more preferably 5-15; most preferably 9-11). One wash volume is defined as an equal volume of diafiltration medium, e.g. nuclease free water, of the initial feed volume.

TMP excursion experiments can be helpful to determine optimal conditions for mRNA molecule purification. Exemplarily, a total of 5 ml feed solution comprising a target mRNA molecule concentration of 1.0 mg/ml in the diafiltration buffer used in step (IIa) as described above was diafiltrated using a 100 kDa MWCO mPES filter column and a flow rate of 15 ml/min. The permeate flux was measured in ml/min at 6 different TMP values ranging from about 50 mbar to about 150 mbar. As it can be seen in FIG. 10 for tdTomato mRNA, the optimal TMP was determined to be about 50 mbar at a flow rate of 15 ml/min but this might dependent on the experimental setting.

Comparative Example

In the following, an example is described that was performed in order to compare results obtained by the method disclosed herein (approach 1) and by the method disclosed in WO 2015/164773 A1 (approach 2).

Approach 1

In vitro transcribed, unmodified hCFTR mRNA (cf. U.S. Pat. No. 9,713,626 B2; 5 mg pellet) was spiked with DNA oligonucleotides of 25 nucleotides (nt) and 120 nt length as well as with 256 nt long glucagon-like peptide 1 molecules (GLP-1 mRNA molecules (SEQ ID NO: 1). The 25 nt long DNA oligonucleotides were spiked into the mRNA at a ratio of 2.5% referring to the total amount of mRNA in μg. The 120 nt long DNA oligonucleotides were spiked into the mRNA at a ratio of 5.0% referring to the total amount of mRNA in μg. And the 256 nt long GLP-1 mRNA molecules were spiked into the mRNA at a ratio of 16% referring to total mRNA amount in μg.

The spiked mRNA molecules were precipitated using 2.5 M NH$_4$OAc (pH 7).

For removing proteins, salts and abortive transcripts step (Ia) was performed with 10× wash volumes 2.5 M NH$_4$OAc using a 500 kDa MWCO mPES with 50 mL/min flow rate, and ~200-300 mbar TMP (mRNA concentration: 0.5 mg/mL).

For the removal of NH$_4$OAc and for resolving the mRNA molecules, step (Ib) was performed with 10× wash volumes nuclease-free water using a 50 kDa MWCO mPES with 50 mL/min flow rate, and ~200-300 mbar TMP (mRNA concentration: 0.5 mg/mL).

For removing divalent cations, abortive transcripts, and/or hydrolysis products, step (IIa) was performed with 10× wash volumes of 40 mM MOPS and 10 mM EDTA using a 100 kDa MWCO mPES with 15 mL/min flow rate and ~20 mbar TMP (mRNA concentration: 1.0 mg/mL).

For the removal of the MOPS-EDTA diafiltration buffer, step (IIb) was performed using 10× wash volumes nuclease-free water using a 100 kDa MWCO mPES with 15 mL/min flow rate and ~20 mbar TMP (mRNA concentration: 1.0 mg/mL).

Obtained mRNA molecules were investigated using a Fragment Analyzer/reversed-phase HPLC in view of the removal of spiked oligonucleotides, and a Nanodrop for the determination of mRNA molecule recovery.

Approach 2 (as Described in WO 2015/164773 A1)

In vitro transcribed, unmodified hCFTR mRNA (cf. U.S. Pat. No. 9,713,626 B2; 10.26 mg pellet) was spiked with DNA oligonucleotides of 25 nucleotides (nt) and 120 nt length as well as with 256 nt long GLP-1 mRNA molecules (SEQ ID NO: 1). The 25 nt long DNA oligonucleotides were spiked into the mRNA at a ratio of 2.5% referring to the total amount of mRNA in μg. The 120 nt long DNA oligonucleotides were spiked into the mRNA at a ratio of 5.0% referring to the total amount of mRNA in μg. And the 256 nt long GLP-1 mRNA molecules were spiked into the mRNA at a ratio of 16% referring to total mRNA amount in μg.

The spiked mRNA molecules were precipitated using i) guanidinium thiocyanate; sodium lauryl sarcosyl, and sodium citrate to final concentrations of 2.09 M guanidinium thiocyanate; 0.26% sodium lauryl sarcosyl, and 13.0 mM sodium citrate and ii) absolute ethanol to final concentration of ~38% EtOH, and incubated for 5 minutes at RT.

Loading was performed using ~22 mL precipitated mRNA with a flow rate of ~6 mL/min using a 500 kDa MWCO mPES (mRNA concentration: 0.52 mg/mL).

Washing was performed by repeating the flowing two steps >5 times with ~6 mL/min flow rate using a 500 kDa MWCO mPES (mRNA concentration: 0.52 mg/mL): step a) washing using 5 mL of 2.09 M guanidinium thiocyanate; 0.26% sodium lauryl sarcosyl; 13.0 mM sodium citrate; ~38% EtOH, and step b) washing using 5 mL 80% ethanol.

Elution (step C) was performed by treating the obtained solid mRNA with 5 mL nuclease-free water and re-circulating for 5-10 minutes (permeate closed) to ensure dissolution. This procedure was repeated until no more mRNA molecules were recovered using ~6 mL/min flow rate and a 500 kDa MWCO mPES (mRNA concentration: 0.52 mg/mL).

Dialysis (step D) was performed using ~5 wash volumes with 1 mM sodium citrate (pH 6.4), ~6 mL/min flow rate and a 100 kDa MWCO mPES (mRNA concentration: 0.52 mg/mL).

Obtained mRNA molecules were investigated using a Fragment Analyzer/reversed-phase HPLC in view of the removal of spiked oligonucleotides, and a Nanodrop for the determination of mRNA molecule recovery.

Of note, the following change was done in case of Approach 2 described above compared to the method described in WO 2015/164773 A1: After linear downscaling for keeping the shear rate on the filter column constant, the initially planned flow rate was 6 mL/min. However, this flow rate resulted in a very low TMP, i.e. the effective permeate flow rate was 0 mL/min and diafiltration was not possible. Therefore, the flow rate was step wise increased until a sufficient TMP was observed leading to a considerable permeate flux. Thus, the final flow rate used for steps a) to d) ranged from 20-24 mL/min (permeate flow rate between 1.1 and 1.25 mL/min).

The results shown in Table 13 were obtained by the Fragment Analyzer analysis that was performed for non purified and purified hCFTR mRNA samples. The respective electropherograms are shown in FIG. 11 for Approach 1 and in FIG. 12 for Approach 2, respectively.

TABLE 13

| Process step | Residual amount of 25 nt DNA oligo [%] | Residual amount of 120 nt DNA oligo [%] | Residual amount of 256 nt mRNA [%] |
| --- | --- | --- | --- |
| Before purification | 100.0% | 100.0% | 100.0% |
| Ia/Ib | 0.0% | 1.1% | 81.6% |
| IIa | 0.0% | 0.0% | 2.3% |
| IIb | 0.0% | 0.0% | 2.4% |
| Step C | 0.0% | 25.6% | 86.6% |
| Step D | 0.0% | 5.7% | 91.4% |

In case of Approach 1, removal of spiked DNA oligonucleotides (25 nt and 120 nt) was mainly achieved by step (Ia)/(Ib). Step (IIa) was required to remove the 256 nt mRNA representing longer hydrolytic products. Step (IIb) did not further remove the 256 nt mRNA, showing that for the removal of hydrolytic products and abortive sequences step (IIa) using a potent chelating agent such as EDTA is essential.

In case of Approach 2, removal of spiked DNA oligonucleotides (25 nt and 120 nt) was only partially achieved by step A to C. Step D did not completely remove the 120 nt DNA oligonucleotides. The 256 nt mRNA representing longer hydrolytic products almost completely remained in the sample after TFF purification. Thus, performing a dialysis using 1 mM sodium citrate (step D) had no strong effect on further elimination of the 120 nt long DNA oligonucleotides representing abortive mRNA molecules and especially of the 256 nt long mRNA representing longer hydrolytic products.

In the following, the 256 nt long mRNA sequence used herein is described in further detail.

Codon optimized GLP-1 sequence

SEQ ID No: 1

$_{GGGAGA}$CUGCCAAGAUGAAGAUCAUCCUGUGGCUGUGCGUGUUCGGCCUG

UUCCUGGCCACCCUGUUCCCCAUCAGCUGGCAGAUGCCUGUGGAAAGC

GGCCUGAGCAGCGAGGAUAGCGCCAGCAGCGAGAGCUUCGCCAAGCGG

AUCAAGAGACACGGCGAGGGCACCUUCACCAGCGACGUGUCCAGCUAC

CUGGAAGGCCAGGCCGCCAAAGAGUUUAUCGCCUGGCUCGUGAAGGGC

AGAGGCUGA$^{GAAUU}$

Part of the T7 promoter, C: Ethris minimal 5'UTR, followed by an additional U nucleotide, TISU 5'UTR, start codon, codon optimized GLP-1 mRNA sequence, stop codon, Part of EcoRI Restriction Site Non-Polyadenylated mRNA was Used for Spiking Experiments

The invention claimed is:

1. A method of purifying mRNA molecules, said method comprising
   (Ia) purifying precipitated mRNA molecules from a suspension comprising precipitated mRNA molecules using a first solution,
   (Ib) washing and dissolving the purified precipitated mRNA molecules obtained from step (Ia) using a second solution,
   (IIa) purifying the mRNA molecules from the dissolved mRNA molecules obtained from step (Ib) using a third solution comprising a chelating agent, followed by
   (IIb) washing the purified mRNA molecules obtained from step (IIa) using a fourth solution,
   wherein steps (Ia) to (IIb) are performed using tangential flow filtration.

2. The method according to claim 1, wherein the chelating agent is EDTA.

3. The method according to claim 1, wherein the third solution has a pH between 1 and 10.

4. The method according to claim 1, wherein the third solution comprises MOPS buffer.

5. The method according to claim 1, wherein steps (Ia) to (IIb) are performed at a temperature between 0° C. and 25° C.

6. The method according to claim 1, wherein before step (Ia) said suspension is obtained using ammonium acetate for precipitating the mRNA molecules, and wherein the first solution contains ammonium acetate.

7. The method according to claim 1, wherein the second solution is water and/or wherein the fourth solution is water or comprises sodium chloride and/or citrate.

8. The method according to claim 1, wherein the mRNA molecules are comprised in a retentate after tangential flow filtration.

9. The method according to claim 8, wherein the retentate obtained in step (Ia) is used as feed solution for tangential flow filtration in step (Ib), the retentate obtained from step (Ib) as feed solution in step (IIa), and the retentate obtained from step (IIa) as feed solution in step (IIb).

10. The method according to claim 1, wherein the mRNA molecules comprised in the suspension are obtained by in vitro transcription.

11. The method according to claim 1, wherein the method further comprises dephosphorylating and/or polyadenylating and/or post-capping the mRNA molecules.

12. The method according to claim 11, wherein the method comprises dephosphorylating the mRNA molecules obtained from step (Ib), followed by performing steps (Ia) to (IIb), followed by polyadenylating the obtained mRNA molecules, followed by performing steps (Ia) to (IIb).

13. The method according to claim 1, wherein in case of step (Ia) a filter membrane having a size rating of a molecular weight cut off ranging from 300 kDa to 750 KDa or a pore size ranging from 0.05 µm to 0.65 µm is used for tangential flow filtration, and/or wherein in case of steps (Ib) and (IIb) a filter membrane having a size rating of a molecular weight cut off ranging from 1 kDa to 300 kDa or a pore size ranging from 0.05 µm to 0.65 µm is used, and/or wherein in case of step (IIa) a filter membrane with a molecular weight cut-off of at least 50 kDa is used.

14. The method according to claim 1, wherein the diafiltration volume of any of the first, second, third, and/or fourth solution is at least 1-fold the volume of the suspension of step (Ia).

15. A method for producing a pharmaceutical composition comprising
   (a) purifying mRNA molecules according to a method of claim 1, and
   (b) formulating the thus obtained mRNA molecules into a pharmaceutical composition.

* * * * *

SEQUENCE LISTING

```
<160> NUMBER OF SEQ ID NOS: 1

<210> SEQ ID NO 1
<211> LENGTH: 256
<212> TYPE: RNA
<213> ORGANISM: Artificial Sequence
<220> FEATURE:
<223> OTHER INFORMATION: Codon optimized GLP-1 sequence

<400> SEQUENCE: 1
gggagacugc caagaugaag aucauccugu ggcugugcgu guucggccug uuccuggcca      60
cccuguuccc caucagcugg cagaugccug uggaaagcgg ccugagcagc gaggauagcg     120
ccagcagcga gagcuucgcc aagcggauca agagacacgg cgagggcacc uuccaccagcg    180 acguguccag cuaccuggaa ggccaggccg ccaaagaguu uaucgccugg cucgugaagg     240
gcagaggcug agaauu                                                     256
```